United States Patent
Kim et al.

(10) Patent No.: US 9,642,338 B2
(45) Date of Patent: May 9, 2017

(54) HAND CONTROLLER FOR ELECTRONIC TRAINER

(75) Inventors: Bryant Y. Kim, Dallas, TX (US); Joon S. Kim, Dallas, TX (US)

(73) Assignee: DT SYSTEMS, INC., Dallas, TX (US)

( * ) Notice: Subject to any disclaimer, the term of this patent is extended or adjusted under 35 U.S.C. 154(b) by 931 days.

(21) Appl. No.: 13/609,087

(22) Filed: Sep. 10, 2012

(65) Prior Publication Data

US 2013/0239904 A1 Sep. 19, 2013

Related U.S. Application Data

(63) Continuation-in-part of application No. 13/528,156, filed on Jun. 20, 2012, now abandoned, and a continuation-in-part of application No. 12/611,856, filed on Nov. 3, 2009.

(60) Provisional application No. 61/532,491, filed on Sep. 8, 2011, provisional application No. 61/540,169, filed on Sep. 28, 2011, provisional application No. 61/499,018, filed on Jun. 20, 2011.

(51) Int. Cl.
| | |
|---|---|
| *G08B 23/00* | (2006.01) |
| *G05D 13/00* | (2006.01) |
| *A45F 5/00* | (2006.01) |
| *A01K 15/02* | (2006.01) |

(52) U.S. Cl.
CPC .......... *A01K 15/021* (2013.01); *A01K 15/023* (2013.01)

(58) Field of Classification Search
CPC .... A01K 15/023; A01K 15/04; A01K 27/009; H04M 3/42; G05D 1/0033; G05D 1/0016; B66F 9/07581; B66F 17/003; G08C 17/02

USPC .............. 455/411, 414.1–414.4, 456.1, 444; 340/573.3, 573.4, 573.1, 539.13; 119/721, 719; 242/357.1
See application file for complete search history.

(56) References Cited

U.S. PATENT DOCUMENTS

| | | | |
|---|---|---|---|
| 8,783,212 B2* | 7/2014 | Bellon ................. | A01K 15/021 119/720 |
| 8,922,363 B2* | 12/2014 | So ........................ | A01K 11/008 119/719 |
| 9,207,673 B2* | 12/2015 | Pulskamp ........... | B66F 9/07581 |
| 2007/0204803 A1* | 9/2007 | Ramsay ....................... | 119/720 |
| 2008/0024961 A1* | 1/2008 | Anderson ............... | G06F 1/163 361/679.3 |
| 2008/0055154 A1* | 3/2008 | Martucci et al. .......... | 342/357.1 |
| 2009/0032560 A1* | 2/2009 | Strandberg ................ | A45F 5/00 224/267 |
| 2009/0102668 A1* | 4/2009 | Thompson et al. ........ | 340/573.3 |
| 2010/0283602 A1* | 11/2010 | Tsai ................... | G08B 21/0269 340/539.13 |
| 2012/0017846 A1* | 1/2012 | Duncan ................ | A01K 15/021 119/720 |

(Continued)

*Primary Examiner* — Khawar Iqbal

(57) ABSTRACT

A controller of a training system is disclosed. In at least one embodiment of the invention, a controller defines an inner curved surface and includes a strap or clip so that the controller may be worn by the user comfortably and securely on either the backside of the hand, on the fingers, in the palm of the hand, on a wrist, arm or leg. The controller includes programmable control elements that allow a user to specify what functions are activated on a trainer by selection or depression of the control elements. In one embodiment, the controller may be programmed via a remote computing unit such as a computer or a smart phone. Alternatively, the controller can be programmed manually.

20 Claims, 19 Drawing Sheets training system 850

(56) References Cited

U.S. PATENT DOCUMENTS

2012/0272924 A1* 11/2012 So ................. A01K 15/021
119/720

* cited by examiner electronic fence system 100 electronic fence system 200 electronic fence system 300 response curves controller 600 controller 600 controller 600 controller 600 controller 650 controller 650 controller 650 controller 650 controller 700 controller 700 controller system 800 controller 750

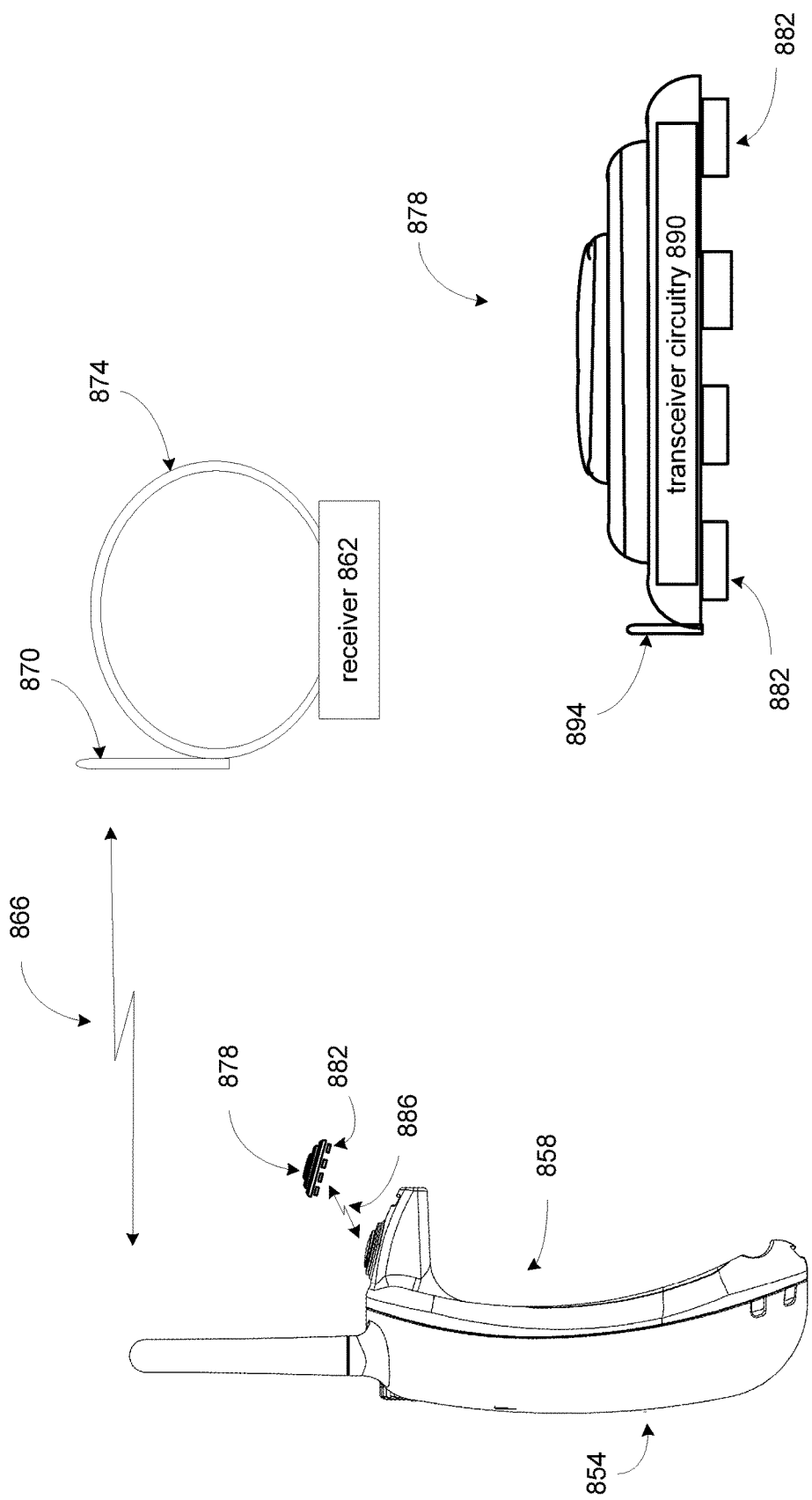

detachable control element
878 detachable control element
878 controller 950 with detachable extension 954 controller 600 programmable functionality controller 600 programmable functionality

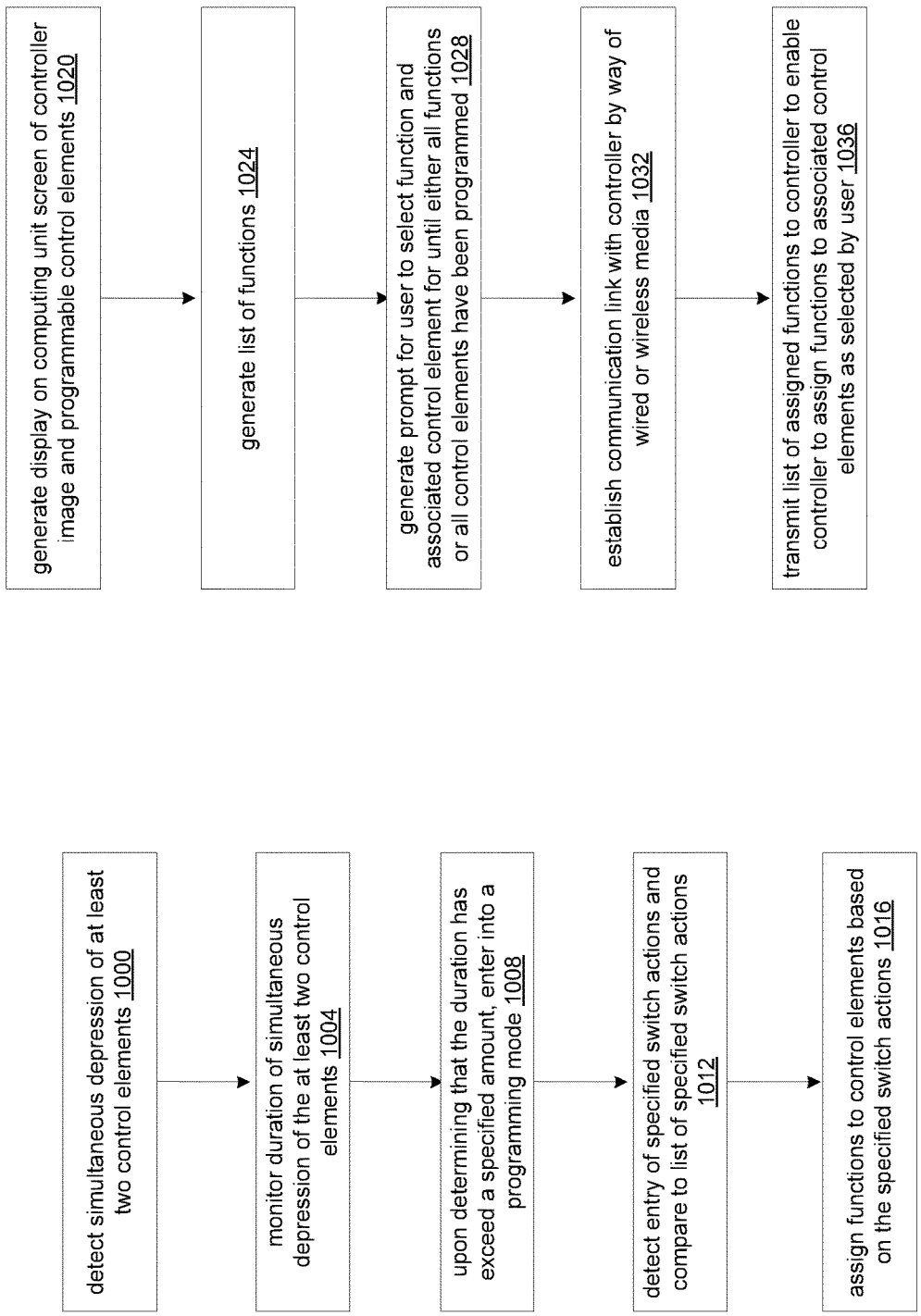

training system 1100 computing unit 1102

HAND CONTROLLER FOR ELECTRONIC TRAINER

CROSS-REFERENCE TO RELATED APPLICATIONS

The present U.S. Utility patent application claims priority pursuant to 35 U.S.C. §119(e) to U.S. Provisional Application Ser. No. 61/532,491, entitled "Hand Controller for Electronic Trainer" filed on Sep. 8, 2011, and to U.S. Provisional Application Ser. No. 61/540,169, entitled "Hand Controller for Electronic Trainer" filed on Sep. 28, 2011. The present U.S. Utility patent application claims priority pursuant to 35 U.S.C. §119(e) or §120 to and is a Continuation-in-Part of U.S. Utility application Ser. No. 13/528,156, entitled "Smart Phone Based Electronic Fence System" filed on Jun. 20, 2012 and which claims priority to U.S. Provisional Application Ser. No. 61/499,018 and which is a Continuation-in-Part of U.S. Utility application Ser. No. 12/611,856 filed on Jan. 15, 2009.

BACKGROUND OF THE INVENTION

1. Field of the Invention

The present invention relates to a hand controller or transmitter for use with an electronic training systems which may include electronic fence systems.

2. Description of the Related Art

In general, electronic trainers and electronic fences for containing an animal are known. In the prior art fence systems, a cable has typically been buried within the ground to define a fenced in area. An animal wearing an associated collar would be stimulated when within a specified range or distance from the buried (or exposed) cable. Generally, through using a radio signal obtained from the electronic wires, an electronic shock, vibration, or both of them simultaneously can be transferred to an animal. Such a fence system thus operates to control an animal's movement within the fenced in area.

Additionally, in reference to the above cited application to which this application claims priority, electronic fences are defined that use GPS to define a fence area, or more accurately, an area within which an animal is to be contained. An invisible electronic fence (I-Fence) refers to a system for defining a certain range of areas whereby a moving object including a pet animal, a hunting dog, and a working dog movement is contained and/or monitored. Thus an I-Fence is a system that supports monitoring and tracking the animal's location by radiating a control signal in accordance with a communication protocol if he or she is out of the range.

In some embodiments of the electronic fences to which this application claims priority, the fence system includes logic that only stimulates the animal when the animal is exiting the fenced area and not when the animal is approaching to enter the fenced area.

One aspect of the various electronic fence systems and training systems is that the controller of a fence system or a training system is held by a user in the user's hand. Accordingly, the user is not able to use the hand for other purposes without putting the controller (transmitter) down.

SUMMARY OF THE INVENTION

Accordingly, the present invention provides a controller that allows the controller to be worn on a user's hand (front or back), in the palm of the hand, one the user's fingers (front or back side), a wrist, an arm or a leg to enable the user to wear the controller without necessarily losing the ability to use his or her hand.

To accomplish this, the controllers of the various embodiments of the invention define a shape that supports the controller being worn by the user. In one embodiment, the controller includes attachment points that allow straps to be fastened to the controller to allow the user to wear the controller. The attachment points are disposed to allow the controller to be worn in a direction that is orthogonal to the direction of the hand or parallel to the direction of the hand. Alternatively, the controller includes a clipping mechanism to allow the controller to be clipped, for example, to the back of the user's hand or fingers. In yet another embodiment, the controller itself is shaped to substantially circumvent the user's hand or fingers so that the user does not have to exclusively hold the controller.

As another aspect of the embodiments of the present invention, the controller defines an internally curved shape to allow the controller to be worn more comfortably around a curved shape body part such as the back of the hand, a wrist, an arm or a leg. As yet another aspect of the invention, the controller includes in some embodiments, at least one outwardly extending portion that further includes at least one control element to facilitate access to the at least one control element by a finger or thumb.

BRIEF DESCRIPTION OF THE DRAWINGS

The above and other aspects, features and advantages of the present invention will be more apparent from the following detailed description taken in conjunction with the accompanying drawings, in which:

FIG. 18 is a diagram that illustrates one embodiment of a training system.

FIG. 19 is a functional diagram that illustrates one embodiment of a removable control element.

FIGS. 25 and 26 are flow charts that illustrate alternative embodiments of the invention for programming a controller.

DETAILED DESCRIPTION OF THE EXEMPLARY EMBODIMENTS

Figure 1:
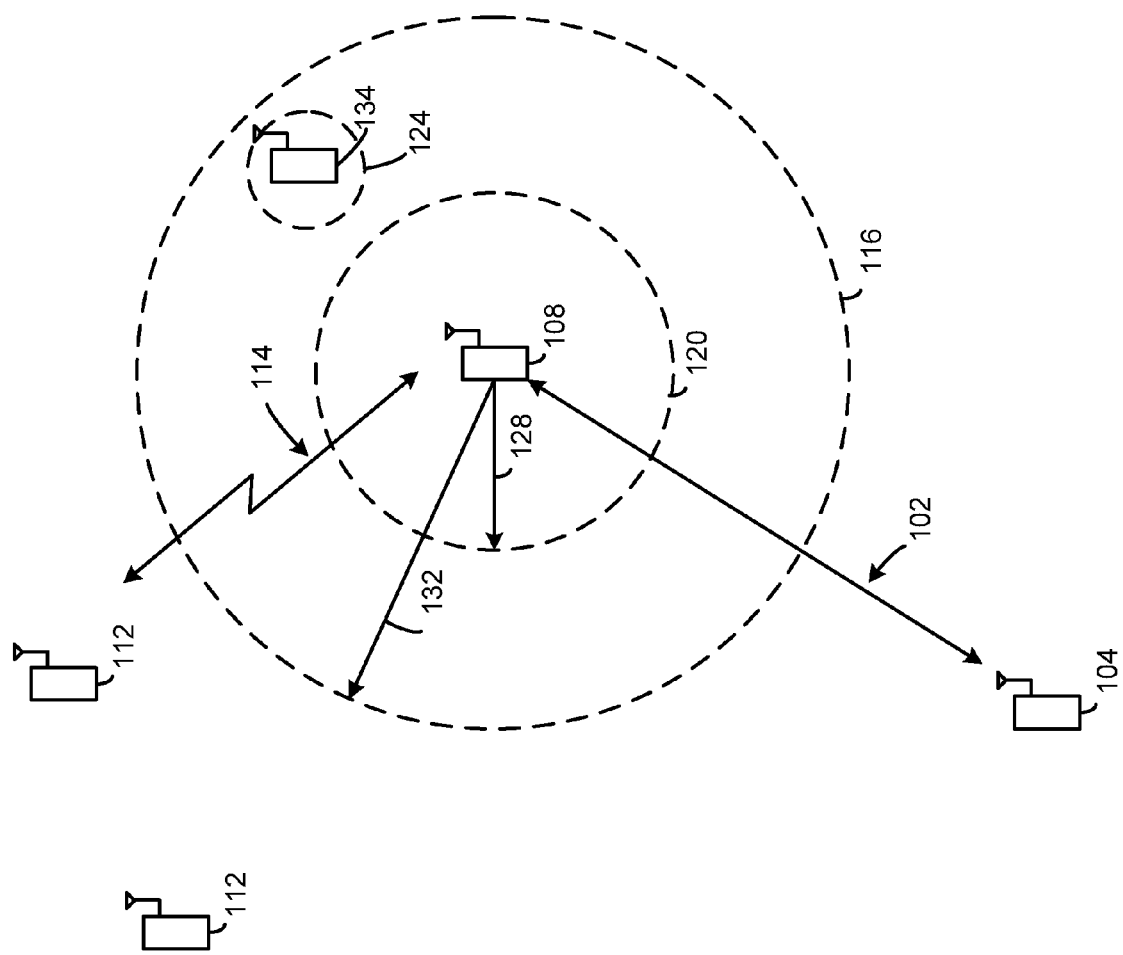
FIG. 1 is a functional block diagram of an electronic fence system according to one embodiment of the invention.

FIG. 1 is a functional block diagram of an electronic fence system according to one embodiment of the invention. Referring to FIG. 1, an electronic fence system 100 capable containing animals within an electronic fence and of guiding animals to return to a control area is shown. The electronic fence system 100 includes a transmitter unit 104 for generating radio frequency (RF) signals wherein the transmitter unit is operable to select between at least one of a plurality of functions and to generate a control command over a communication link 102 specifying at least one of vibration, high-frequency beep, vibration with high frequency beep, shock and shock intensity. The electronic fence system further includes a receiver unit 108 for receiving the transmitted RF signals and the control command wherein the receiver unit 108 initiates a stimulation based upon the control command. Receiver unit 108, in one embodiment, further includes a plurality of antennas structurally arranged in relation to a collar worn by an animal to receive radio frequency communication signals from a plurality of devices. In one embodiment, receiver unit 108 includes one antenna for receiving control commands from transmitter unit 104 and one antenna for receiving global positioning system (GPS) signals from which a receiver unit location may be determined by receiver unit 108. In one particular embodiment, at least one of the antennas is disposed within a collar that is attached to receiver unit 108.

Receiver unit 108 further includes a first receiver unit module for receiving control commands from the transmitter unit and a second receiver unit module for receiving satellite information from a plurality of GPS satellite transceivers 112. Such satellite information may be used to perform triangulation calculations to determine a location. Receiver unit 108 is operable to define an electronic fence based upon a specified location in relation to the a determined location based on satellite information 114 received through the second receiver unit module and further wherein the specified location is based upon one of a receiver unit location or a coordinate defined in a control command received from transmitter unit 104. As may be seen, three fenced in areas are created. Each fenced in area 120, 116 and 124 is a circle defined by a radius in relation to a specified location. In the example of FIG. 1, a location is specified by a location of receiver unit 108. Thus, fenced in area 120 is based upon a radius 128 from the location of receiver unit 108. Fenced in area 116 is based upon a radius 132 from the location of receiver unit 108. Fenced in area 124 is an example of a "lock down" mode fence area in which a small fenced area is created in relation to a location of receiver unit 134. The lock down mode of operation is one in which control command is transmitted to the receiver unit by the transmitter unit to prompt the creation of a small "lock-down" electronic fenced in area to contain an animal so that it can be found or secured.

Figure 2:
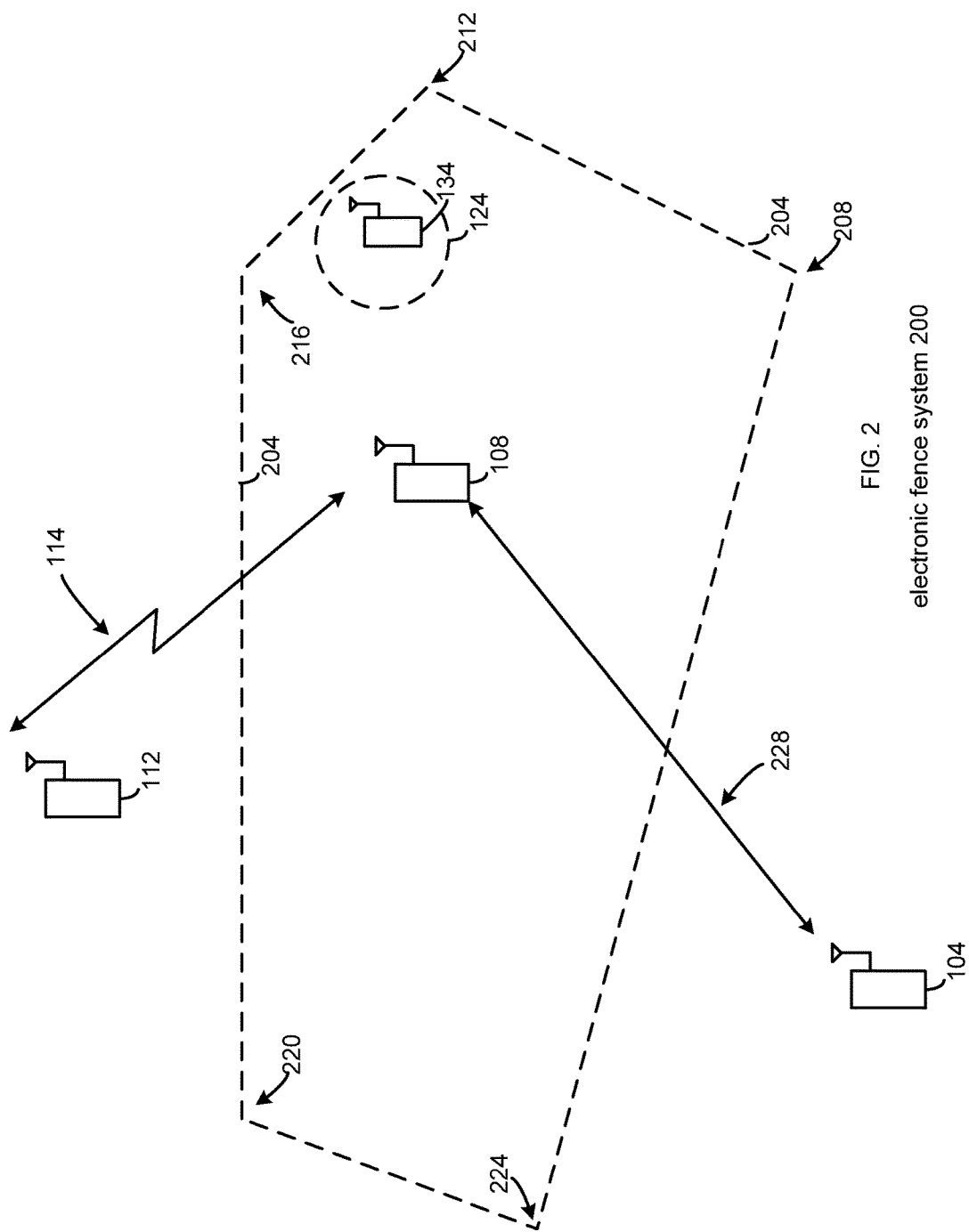
FIG. 2 is a functional block diagram of an electronic fence system according to one embodiment of the invention.

FIG. 2 is a functional illustration of an electronic fence system 200 according to one embodiment of the invention. As may be seen, an irregular shaped fence boundary for an electronic fence 204 encompasses receiver unit 108. Devices having previously defined reference numerals are the same as before. Thus, the fence boundary of electronic fence 204 encompasses lock-down electronic fence 124. One aspect to the embodiment of FIG. 2 is that the fence boundary of fence 204 is defined by straight lines between each of a plurality of designated points 208-224. In one embodiment, designated points for defining the boundary of fence 204 may be made by the user physically going to the designated points 208-224 and then hitting a designation button on one of the transmitter unit 104 or receiver unit 108.

Alternatively, the user may draw a figure on a display of a device (e.g., a computer or transmitter unit 104) wherein the user designates the points on the display. The associated device, e.g., transmitter unit 104, then determines actual coordinates of the designated locations and then transmits the designated location coordinates to receiver unit 108 to enable receiver unit 108 to activate electronic fence 204 to correspond with the designation locations 208-224 that define the boundary of fence 204. Receiver unit 108 compares its current location as determined by communication signal 114 received from satellite transceiver 112 to specified location coordinates 208-224. In the described embodiment, these location coordinates 208-224 are transmitted from transmitter 104 to receiver 108 in communication link 228.

Figure 3:
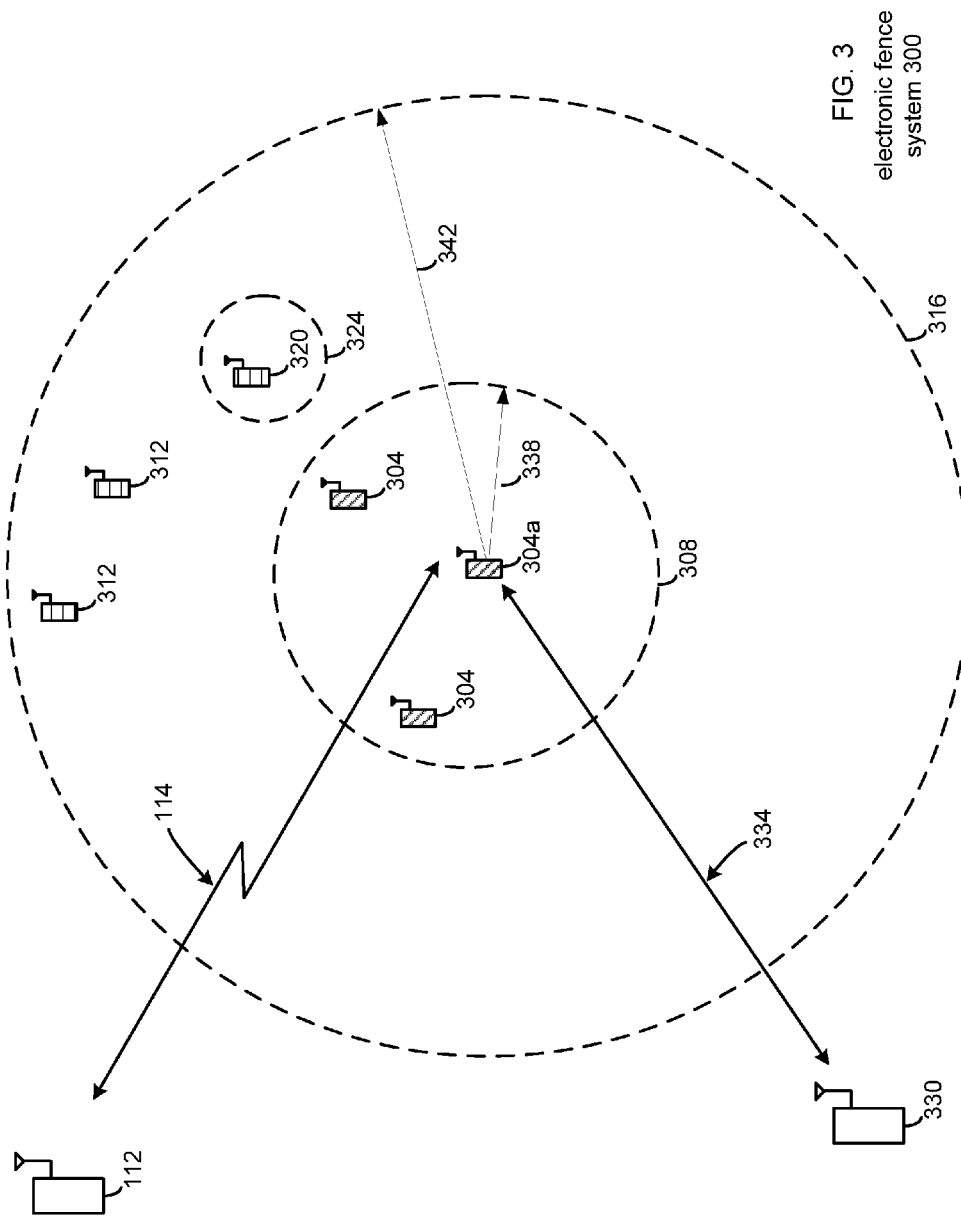
FIG. 3 is a functional illustration of an alternative electronic fence system according to one embodiment of the invention.

FIG. 3 is a functional block diagram that illustrates an additional aspect of the embodiments of the invention. Namely, an electronic fence system 300 is operable to define a plurality of electronic fences for a plurality of groups of receiver units. For example, a first plurality of receiver units having a group ID 304, as indicated by the diagonal shading, are within an electronic fence 308. These receiver units correspond to a common group ID. Thus, fence 308 is used to contain all animals having this common group ID 304. Pluralities of receiver units have a common group ID of 312 correspond to electronic fence 316. These receiver units are illustrated with the horizontal shading.

Finally, a receiver unit 320 within electronic fence 324 that is a lock-down mode fence. Thus, for example, receiver unit 320 may originally had the ability to wander within electronic fence 316 (assuming it had a group ID 312) but for one of a plurality of reasons, the lock-down mode was triggered for receiver unit 320 thereby creating electronic fence 324.

As may be seen here in FIG. 3, three electronic fences are shown. A fence 316 defines an area that encompasses a fence 308. Thus, fence 308 is concentric in relation to fence 316. In the example of FIG. 3, a user defines a fence boundary by defining at least one of a specified location and a distance from the specified location. For example, based on a received control command from transmitter unit 330 received over communication link 334, receiver unit 304a is operable to designate its current location as a fence center. Accordingly, a boundary of fence 308 is a function of a distance 338 (e.g., a radius 338) from the designated location while a boundary of fence 316 is a function of a distance 342 (e.g., a radius 342) from the designated location. In operation, for example, in one embodiment, the designated location is a location of receiver unit 304a at a time a specified control command is received from transmitter unit 330.

In an alternate embodiment, a user defines a fence boundary by defining GPS identified location designations on the transmitter unit 330 and then transmits fence boundary information in a control signal to receiver unit 304a. In one particular embodiment, the user draws a fence boundary pattern on a display of transmitter unit 330 to identify the fence boundary. The fence boundary for fences 308 and 316 are for use in a normal mode of operation.

In one embodiment of the invention, the fence system supports a lock-down mode of operation in which a small defined fence area is activated having a specified radius from a receiver location at the time the lock-down mode is initialized or activated. The lock-down mode may be activated upon receiving a control command from transmitter unit 330, upon satisfying a specified condition (e.g, approaching a specified area or location, upon losing radio contact with transmitter unit 104, or upon reaching a specified battery condition (e.g., only twenty percent charge remaining for the receiver unit 108 battery). Thus, a specified level of depletion of charge may trigger the lock-down mode to facilitate the animal wearing receiver unit 320 being found more readily. As may be seen, fence 324 is concentric in relation to fence 316 but not in relation 308.

Each of FIGS. 1-3 describe aspects of an electronic fence system according to various embodiments of the invention. Additionally, training systems that are used to teach an animal to fetch, to stay, to return, etc. may be implemented solely as training systems or as training systems that also include electronic fence related functionality. With respect to training systems, many different types of stimulation and many different stimulation modes may be implemented to assist in the training of an animal.

Figure 4:
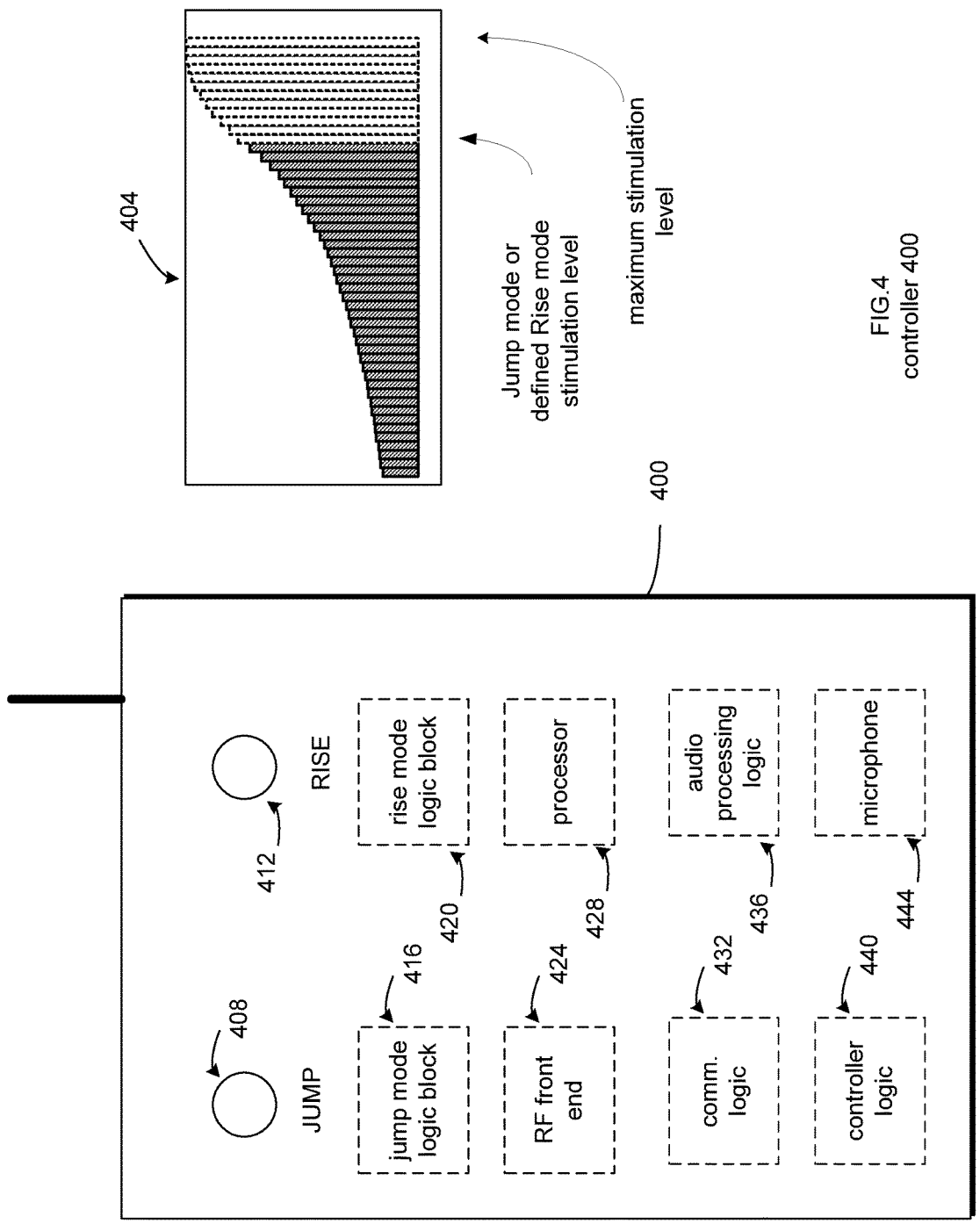
FIG. 4 is a functional block diagram of a hand held transmitter unit for an animal training system according to one embodiment of the invention.

FIG. 4 is a functional block diagram of a hand held transmitter/controller unit for an animal training system according to one embodiment of the invention. As may be seen, a response shown at 404 associated with transmitter unit 400 indicates current stimulation level. The stimulation is based upon selection of associated stimulation levels for a Jump mode and/or by use of a Rise mode button. Thus, transmitter unit 400 includes a Jump mode button 408 for selecting the Jump mode of operation, a Rise mode button 412 for selecting a Rise mode of operation, as well as a plurality of circuit blocks 416-428 shown in dashed lines to indicate internal device elements that control the operation of the transmitter unit and the associated response in the receiver/trainer. Each of the circuit blocks may be formed as discrete state logic or circuit elements or by computer instructions stored in memory and executed by a processor. Thus, the circuit blocks 416-428 include logic blocks that support the Jump mode of operation, the Rise mode of operation, and RF front end for upconverting an outgoing signal produced by the logic blocks or the processor to a radio frequency for wireless transmission and, of course, a processor block which control and defines operation of the transmitter unit.

Generally, the Jump mode refers to stimulation instantly jumping to a user selected stimulation level upon depression of the Jump mode button. This level typically is less than a maximum stimulation level but can be defined to be a maximum stimulation level. The Rise mode of operation refers to stimulation levels gradually increasing as long as the Rise mode button is depressed until a specified (e.g., Jump Mode stimulation level) or a maximum level of stimulation is reached.

If the any of the logic blocks or the processor block produces an output signal in a digital form, analog-to-digital conversion circuitry is included to enable the RF front end to up-convert an outgoing signal from a low frequency (either baseband or an intermediate frequency) to a radio frequency for wireless transmission. The RF front end may implement either a two-step process or a single step process for up-converting to RF. One of average skill in the art may readily determine particular RF front designs appropriate for the present application.

As may also be seen, the hand held transmitter (controller) unit 400 includes communication logic 432 for communicating with a plurality of devices including external computing devices (laptop computer, desktop computer, computer tablet, cell phone, etc.). Communication logic 432 includes logic that support communicating according to various protocols such as IEEE 802.11 (any), Bluetooth, RFID communication protocols, etc. This transmitter/controller 400 of FIG. 4 includes functionality and logic that may be used in any embodiment of a controller including but not limited to controller 600 (described below in this document starting with FIG. 8). Transmitter unit/controller 400 also includes audio processing logic 436, controller logic 440, and a microphone 444. Audio processing logic is operable to process and digitize ingoing audio received by microphone 444. Controller logic 440 is configured to define operational logic to support the functionality described here in this document. For example, controller logic 440 includes logic for receiving control element programming information to support user-based programming/selection of the functions that are assigned to the control elements of controller 400. In the described embodiment, the list of selectable functions that may be assigned to the control elements of controller 400 include generation of vibration, generation of audio (either tone or voice commands), Jump mode electric stimulation, Rise Mode electric stimulation, Nick, etc. When the controller is part of an electronic fence system (in one alternative embodiment), electronic fence functions may also be assigned to the control elements of control element 400. Controller logic 440, therefore, is configured to process programming commands, whether entered manually or received from a remote computing unit, to assign selected functions to the control elements of the controller (as will be described in relation to subsequent figures).

Figure 5:
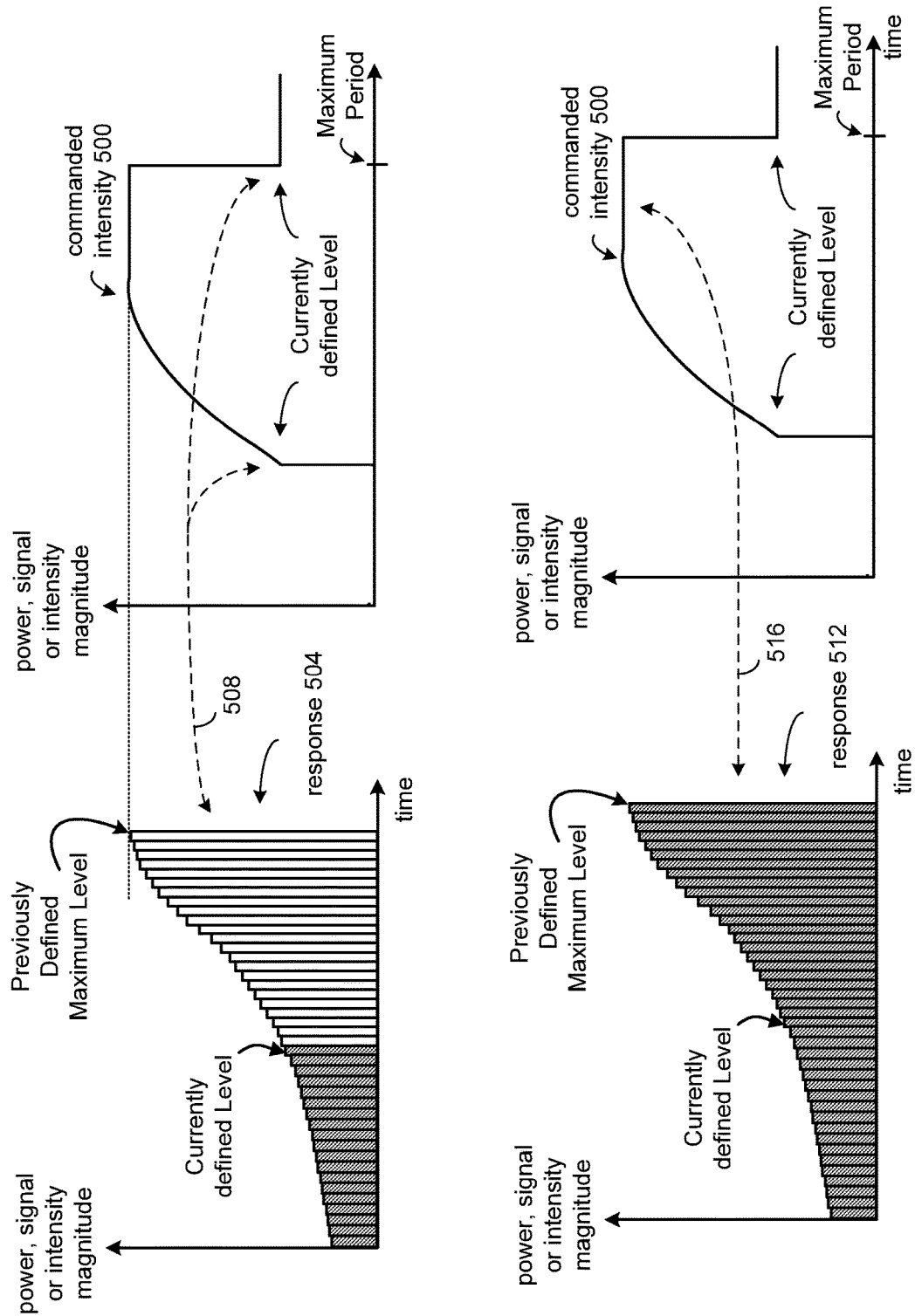
FIG. 5 is a plurality of diagrams that illustrate hand held controller responses in relation to transmitter commanded intensity curves that reflect operation of a controller according to one embodiment of the invention for the Rise mode of operation.

FIG. 5 is a plurality of diagrams that illustrate hand held controller responses in relation to transmitter commanded intensity curves that reflect operation of a controller according to one embodiment of the invention for the Rise mode of operation. Generally, these illustrated responses show transmitter/controller commands or control signals that are transmitted to a receiver/trainer to prompt a corresponding response. Referring to FIG. 5, it may be seen that, upon depression of the Rise mode button, that the commanded intensity 500 of the stimulation increases from a currently defined level to a previously defined maximum level. The intensity may be commanded in any one of a plurality of different methods as will be described in greater detail in reference to at least one figure that follows. The left hand side of FIG. 5 illustrates the response, according to one embodiment of the invention, of the controller in relation to the commanded intensity shown on the right hand side of the figure at the points identified by the dashed arrows. Upon an initial depression of the Rise Mode button, the commanded intensity is the currently defined level (for normal operation). This level of intensity and the corresponding response 504 is as shown by the dashed line 508. The commanded intensity then increases until the Rise Mode button is released or, as shown on the bottom left and bottom right diagrams, when the maximum level is reached. The response 512 illustrates response when the commanded intensity 600 has reached the maximum level as indicated by dashed line 516.

The maximum level may be predefined by the user or within internal controller logic. In the described embodiment, the predefined maximum level defined by the user cannot exceed the maximum level defined with the internal controller logic and can only be set to a value that is less than or equal to the maximum level defined within the controller logic.

After a specified period of the stimulation being at the maximum level, the intensity drops down immediately at a single point to the currently defined level as is indicated by the two commanded intensity curves. This may be seen on the time line at "Maximum Period". Thus, when the Rise mode button is initially depressed, the response shows an intensity level that begins at the currently defined level. Thereafter, the intensity level increases until a maximum intensity is reached. The response for the maximum intensity is the lower of the display graphs on the left hand side of the figure (response 512). Once a maximum period has been reached for the commanded intensity, the intensity level drops to the currently defined level and the response of the upper left hand side of the Figure occurs again.

Thus, the response gradually increases from the response 504 to the response 512 on the left hand side of the figure from initial depression of the Rise mode button until the maximum commanded intensity is reached. From that point forward until a maximum period is reached, response 512 is seen. After the maximum period is reached, though, for the commanded intensity, the response instantly reverts from the bottom left hand of the chart to the upper left hand since, as shown on the right hand side, the commanded intensity drops instantly.

Figure 7:
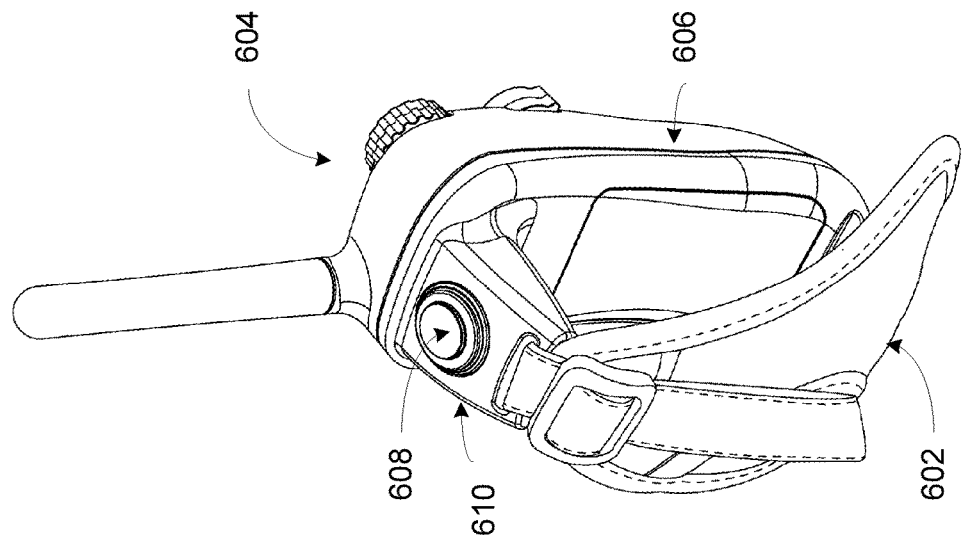
FIGS. 6 and 7 are perspective views of a transmitter or controller according to embodiment of the invention.
Figure 6:
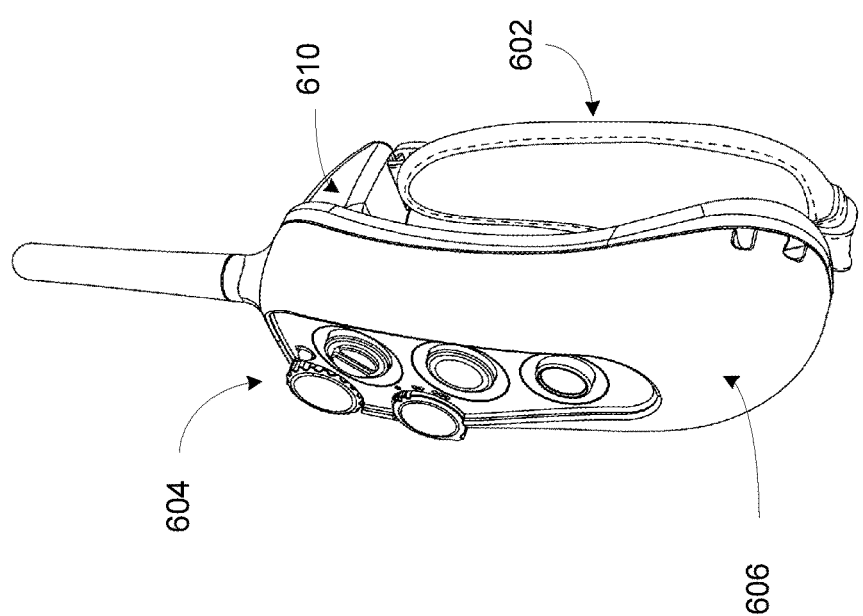

FIGS. 6 and 7 are perspective views of a transmitter or controller according to embodiment of the invention. Referring to FIG. 6, a controller 600 (a transmitter) includes a strap 602 for securely attaching the controller 600 to the bank of a hand, to the fingers of a user's hand, or to an arm, wrist or leg. As may be seen, a plurality of control elements 604 are disposed on an outer surface of a main portion 606 of controller 600. Control elements 604 may comprise one or more of push button switches, rotary switches having multiple switch positions, potentiometers, on/off switches, etc. Referring to FIG. 7, at least one control element 608 is disposed on an upper surface of an extending portion 610 that extends outwardly and substantially orthogonal from an upper end of a main portion 606 of controller 600. As may be seen, if the main portion 606 is oriented in a vertical manner, the outwardly extending portion 610 extends from the upper end of main portion 606 in a substantially horizontal manner. Strap 602 attaches at an outer end of the outwardly extending portion 610 and to a bottom end of the main portion 606 of controller 600. One aspect of outwardly extending portion 610 is that it provides a support for control element 608 to allow access by a thumb of the hand to which the controller 630 is attached.

One aspect of the controller shown in FIGS. 6 and 7 is that the controller defines a shape along an interior surface of the controller that is curved in shape. This curved shape facilitates the controller being worn on a backside of a hand (side opposite of the palm where controllers are traditionally held), on the user's fingers, or on a wrist, arm or leg. The controller may be worn on the backside of the fingers allowing one or more of the control elements to be accessed and/or depressed between the thumb and forefinger or on the interior of the fingers. Of course, each controller of the various embodiments may always be held in the palm of the hand too as traditional transmitters/controllers are held. The curved shape allows the controller to be worn as described in a manner that is comfortable and secure. A traditionally shaped controller (substantially flat) cannot be worn securely or comfortable on a backside of a hand or a wrist, arm or leg even if such controller includes straps for securing the controller to the user.

Figure 16:
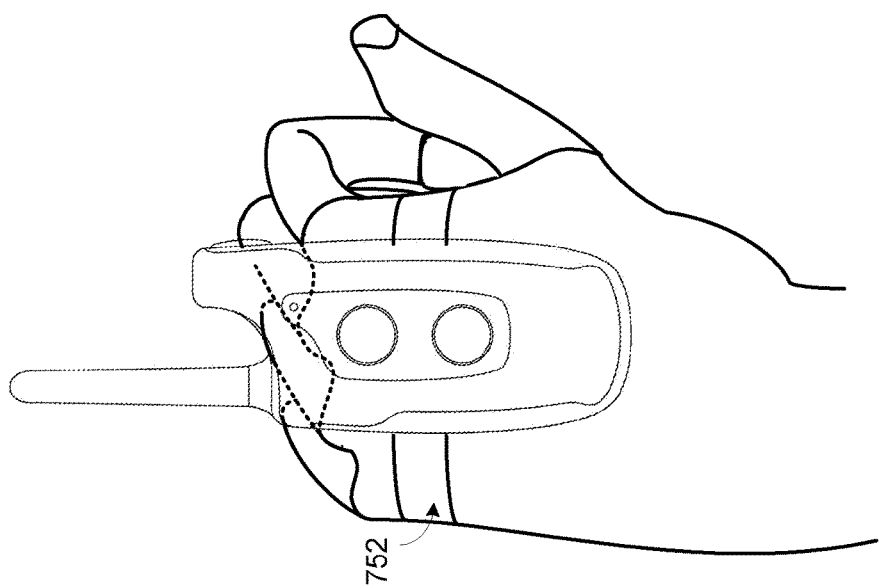
FIG. 16 is an exemplary figure that illustrates a controller being worn in an orientation that is substantially parallel to a direction of a hand to which the controller is attached according to one embodiment of the invention.

One aspect of the embodiments of the present invention is the straps, for example, straps 602 of FIGS. 6 and 7, allow the controller to be attached to the hand, fingers, arm or leg. In the described embodiments, the straps are adjustable and may be secured to the controller to facilitate the controller being worn in a desired orientation at a desired location. For example, the straps may be attached in a manner that the controller can be worn across the backside of the hand perpendicular to a direction of the hand and fingers (with a strap configuration as shown here in FIGS. 6 and 7), or in a manner that the controller is worn parallel to the direction of the hand and fingers as shown below in FIG. 16. While not shown explicitly in FIGS. 6 and 7, main portion 606 may also include supporting structure on the sides on main portion 606 so that a strap to be oriented to allow the controller to be worn orthogonally to the orientation shown here. As such, the controller may be worn in a manner that is substantially parallel to the direction of the hand as shown in FIG. 16 below.

Figure 9:
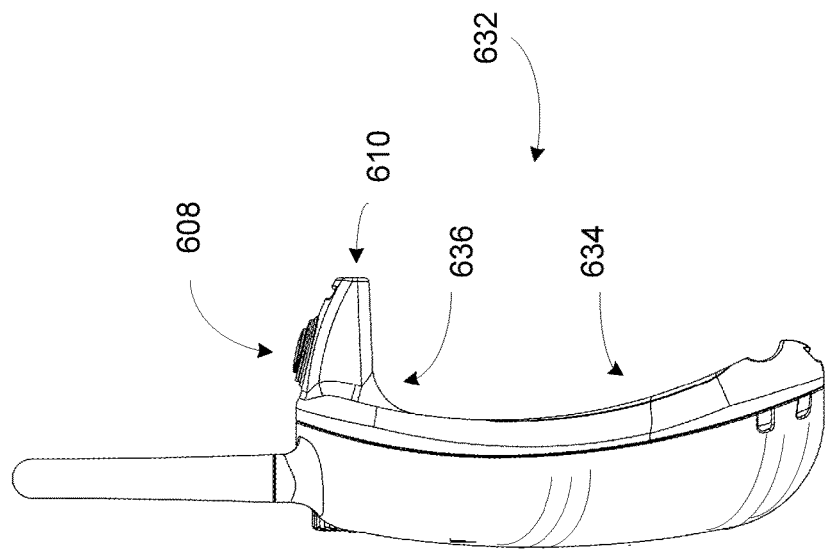
FIGS. 8 and 9 illustrate front and side views of a controller according to one embodiment of the invention.
Figure 8:
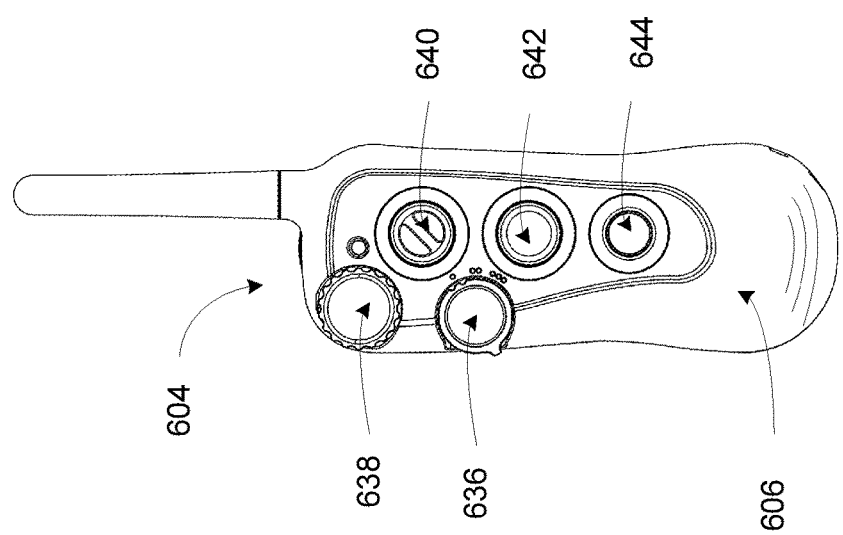

FIGS. 8 and 9 illustrate front and side views of a controller 600 according to one embodiment of the invention. As may be seen, controller 600 includes control elements 604 and 608 as described in relation to FIGS. 6 and 7. Additionally, as the side view of FIG. 9 illustrates, the controllers of the various embodiments of the invention, including controller 600 here, define an internally curved surface 632 to allow the controller to be comfortably and securely worn on an outer surface (back side) of a hand, on the user's fingers, or on an arm, wrist or leg. Internally curved surfaced 632, in the described embodiment, includes at least two curved portions having different radii that define the curve. Specifically, a first curved portion 634 defines a curve that substantially matches a curved shape of a back of a hand while a second curved portion 636 defines a curve that joins outwardly extending portion 610.

One advantage of a controller defining such a curved shape on an interior surface is that the controller may be worn in a manner that does not interfere with the user's ability to use his hand(s) for other purposes such as driving an off road vehicle or holding a hunting weapon while allowing the user to quickly and easily get to the controller to press a button that prompts the controller to transmit an associated control command to an animal wearing an associated receiver.

Referring again to FIG. 8, the control elements shown generally at 604 on the embodiment of controller 600 include five control elements. Control element 636, supports selection between collars while in a training mode of operation in one embodiment. Thus, control element comprises a rotary switch that allows for selection of a plurality of positions (e.g., five positions in one embodiment). Each of the five positions is associated with one specific receiver (dog collar). Each training command signal for an associated stimulation, therefore, is transmitted with an ID that corresponds to or is in association with a selected receiver.

Control element 638 allows a user to select a desired intensity level for a given stimulation type. In one embodiment of the invention, the intensity level is based only on a current setting of control element 638. In another embodiment, an intensity level is stored for each associated receiver for at least one type of stimulation. Thus, as the user rotates control element 636 to select a different receiver, controller 600 is configured to recall the last selected intensity level for any subsequent stimulation commands that are transmitted to the newly selected receiver. When the user adjusts the intensity with control element 638, the adjusted intensity level is then stored for use in subsequent stimulations whenever the newly selected receiver is the currently selected receiver.

In the various embodiments of controller 600, each of control elements 640, 642 and 644 are programmable and may be associated with any one of a plurality of training functions. For example, one control element may be programmed for a "nick" type of stimulation, while another may be programmed for a "rise" or "jump" type stimulation. The "nick" type of stimulation is a short duration shock. Jump and rise type stimulations are as previously discussed. Other types of stimulation that may be associated with these control elements include the generation of a vibration or a sound. The sound can include a recording of a user's voice command such as "stop" or "come".

Referring again to control element 636, a plurality of positions may be programmed to correspond to the selection of a plurality of receivers. In one embodiment, however, positions may also be programmed for other functionality. In one embodiment, one switch position of control element 636 is programmed to deactivate one or more of the other control elements "lock" current settings and prevent inadvertent activation of the associated functions. In essence, the corresponding control elements are disabled. In another embodiment, one or more of the switch positions may be associated with a launcher. The launcher may be either a dummy launcher or a bird launcher. As such, when control element 636 is rotated to select a dummy launcher, for example, depression of a control element such as control element 644 will cause controller 600 to transmit a launch command with the ID of the selected dummy/bird launcher to prompt the selected dummy launcher to fire and launch a dummy. From this point forward, all references to operation in relation to a dummy launcher should be understood to, alternatively, be references to operation in relation to a bird launcher as well.

As another aspect of the embodiment of controller 600, the simultaneous depression of multiple control elements may be used to select between modes of operation instead of assigning switch positions of control element 636 to select modes of operation. In one embodiment, depression of control elements 642 and 644 at the same time for a specified duration prompts the controller to operate as a trainer to generate training commands to selected receivers as discussed above. Depression of control elements 640 and 644 at the same time for the specified duration prompts the controller to operate as a remote for a dummy launcher. When operating as a dummy launcher, depression of a specified or programmed control element 608 or 640-644 prompts the controller 600 to transmit a launch command to a selected or associated dummy launcher to prompt the dummy launcher to fire and launch a dummy. In this embodiment, control element 636 may be used to select one of a plurality of dummy launchers. In a dummy launcher mode of operation, control element 636 is used to select a dummy launcher. In a training mode of operation, control element 636 is used to select a training collar for training commands. When operating in a dummy launch mode, therefore, the launch command is transmitted with a dummy launcher ID that corresponds to the selected dummy launcher when control element 644 is depressed.

Figure 23:
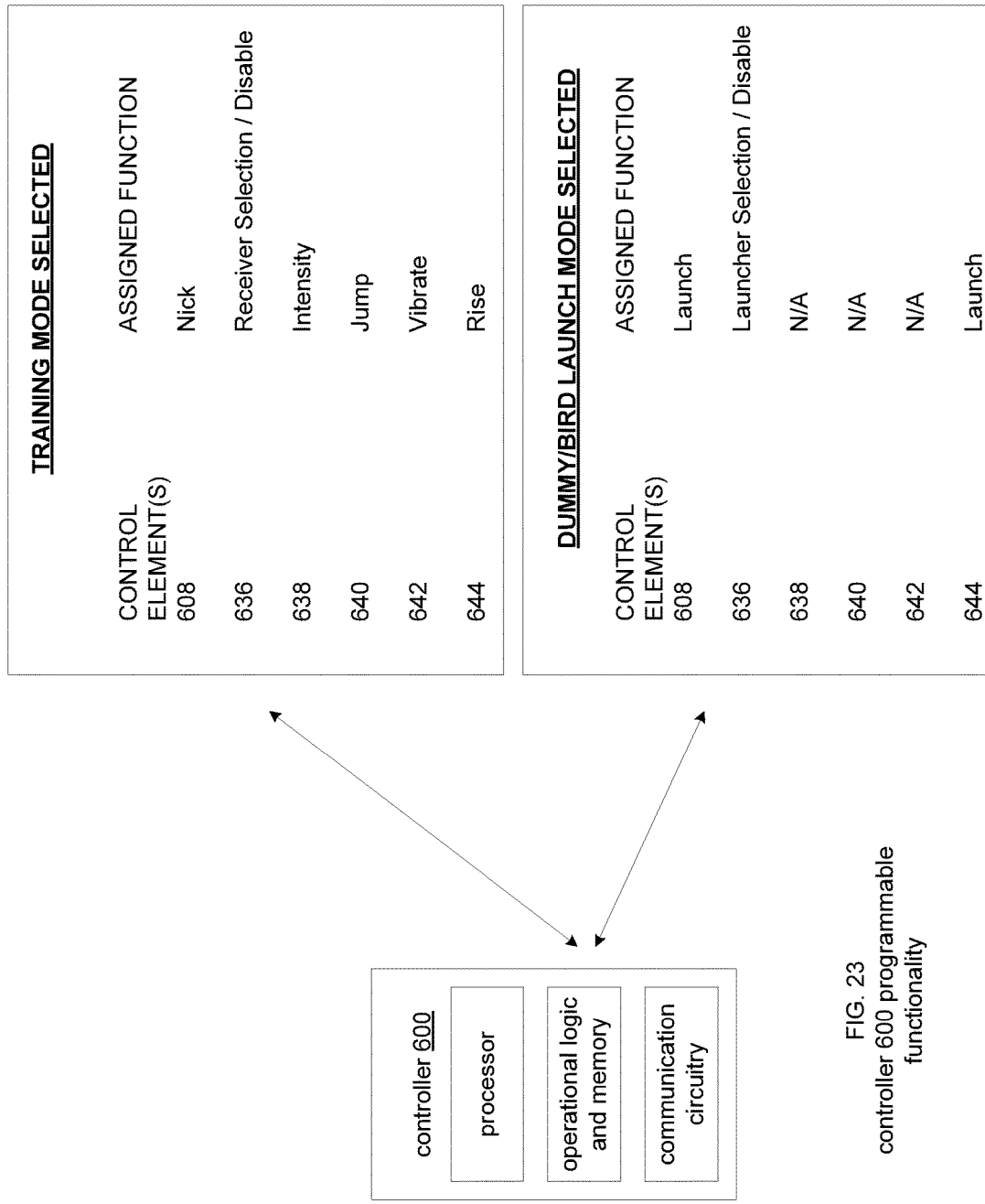
FIG. 23 is a functional block diagram of a controller according to one embodiment of the invention.
Figure 24:
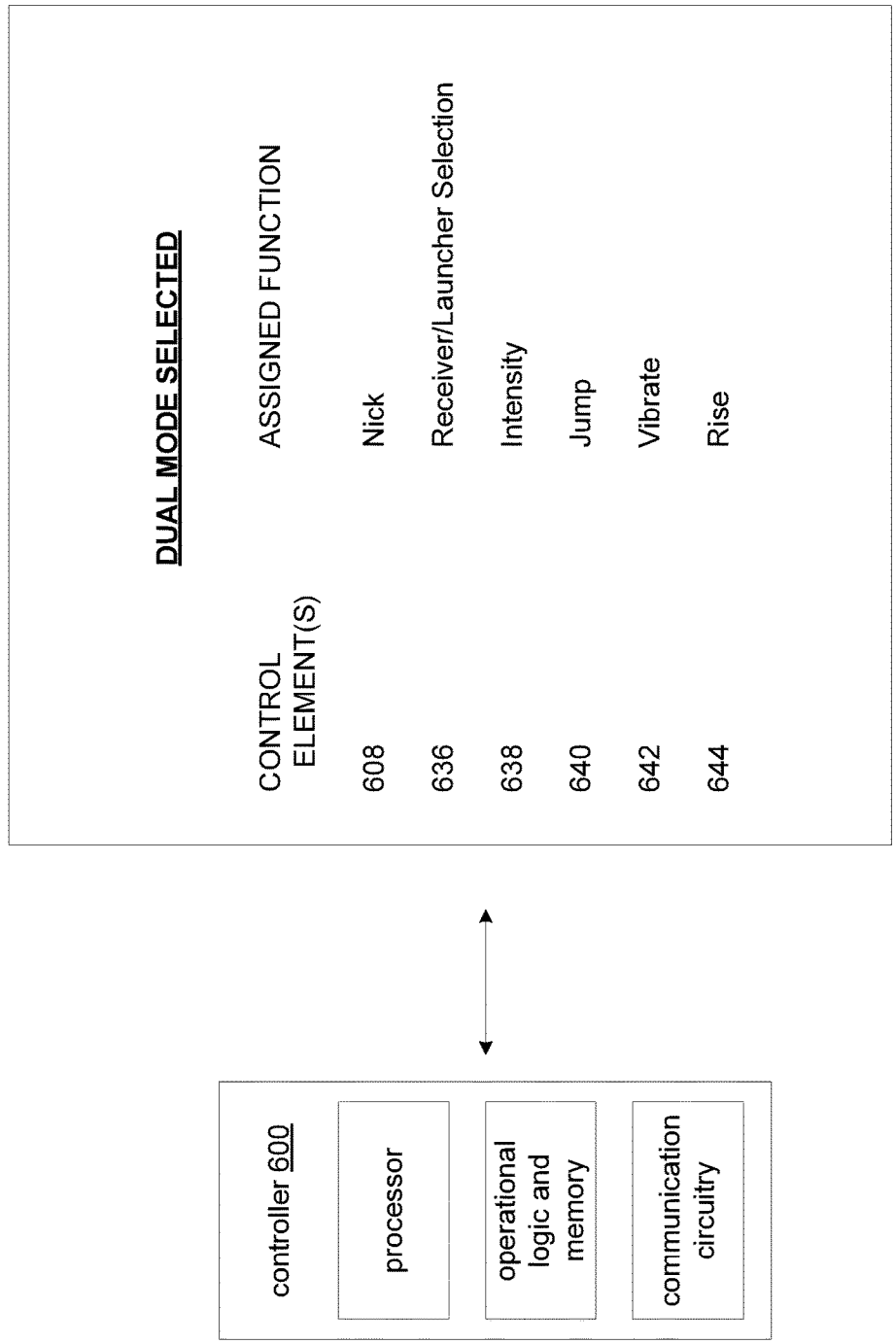
FIG. 24 is a functional block diagram of a controller according to an alternative embodiment of the invention.

Subsequently, depression of control elements 642 and 644 will cause controller 600 to revert back to operation as a trainer controller and the various control elements and associated intensity levels will revert back to prior settings and/or current settings. It should be understood that the specific combinations of control elements and associated functionalities are exemplary. Other combinations of simultaneous depression of control elements may be used to achieve similar or different functionality. For example, a different combination of simultaneous depression of control elements may be used to select between dummy launcher mode and training mode. Additionally, a combination of control elements may be specified to select a dual mode in which some control elements are assigned training functionality and at least one control element is assigned dummy launcher functionality (e.g., to transmit a launch command to a specific dummy launcher). FIGS. 23 and 24 herein illustrate exemplary embodiments of controller 600 configurations for training and launching modes of operation.

Figure 11:
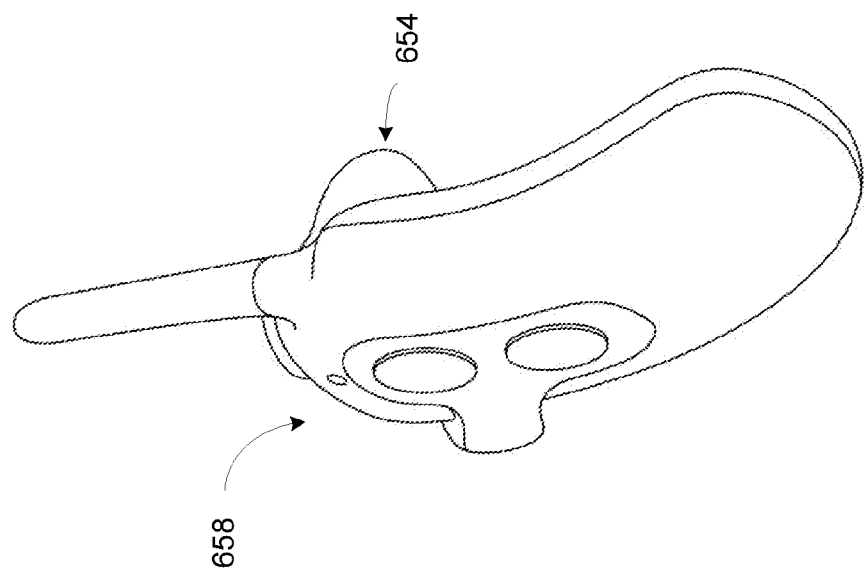
FIGS. 10 and 11 illustrate perspective views of an alternative embodiment of the invention of a hand controller.
Figure 10:
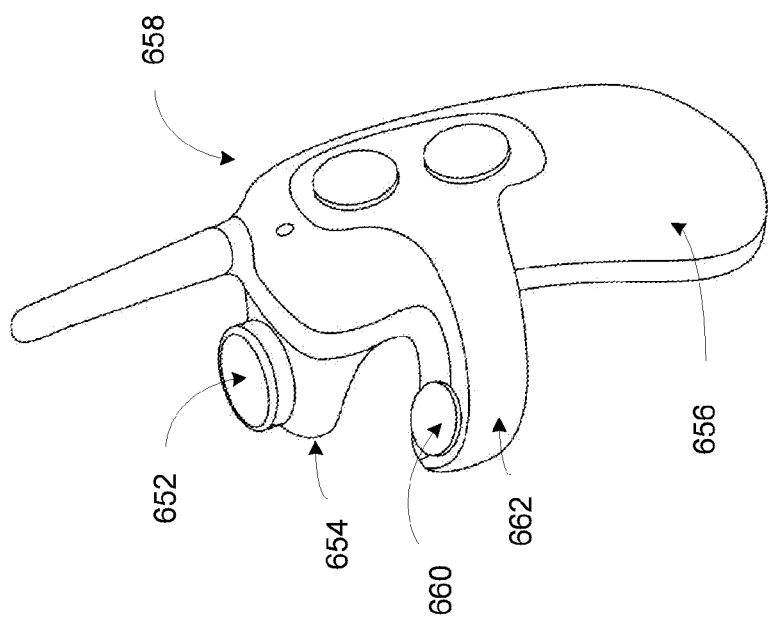

FIGS. 10 and 11 illustrate perspective views of an alternative embodiment of the invention of a hand controller 650. Referring to FIG. 10, at least one control element 652 is disposed on an upper surface of an outwardly extending portion 654 that extends outwardly and substantially orthogonal from a main portion 656 of controller 650. As may also be seen, at least one control element 658 is disposed on an outer surface of the main portion 656 of controller 650. Additionally, at least one control element 660 is disposed on an outwardly extending portion 662. This configuration is one that allows a user to access a control element (here, control element 660) with an index finger while controller 650 is being worn on the back side of the hand orthogonal to the direction of the hand. While the illustrated configuration of control elements 658 are different from the prior figures, it should be understood that any configuration of control elements 658 may be placed on the outer back side surface of a controller (here, controller 650). FIG. 11 merely illustrates controller 650 from a different perspective angle.

The embodiments of FIGS. 10 and 11 include a plurality of outward extending portions that each include a plurality of control elements that may be accessed by a user's thumb and or fingers, such as the index finger, while the controller is being worn on a back side of the user's hand. It should be understood that, while not shown here, controller 650 includes a strap or clip that may be used to secure the controller to the user in at least one orientation in relation to the hand.

Figure 13:
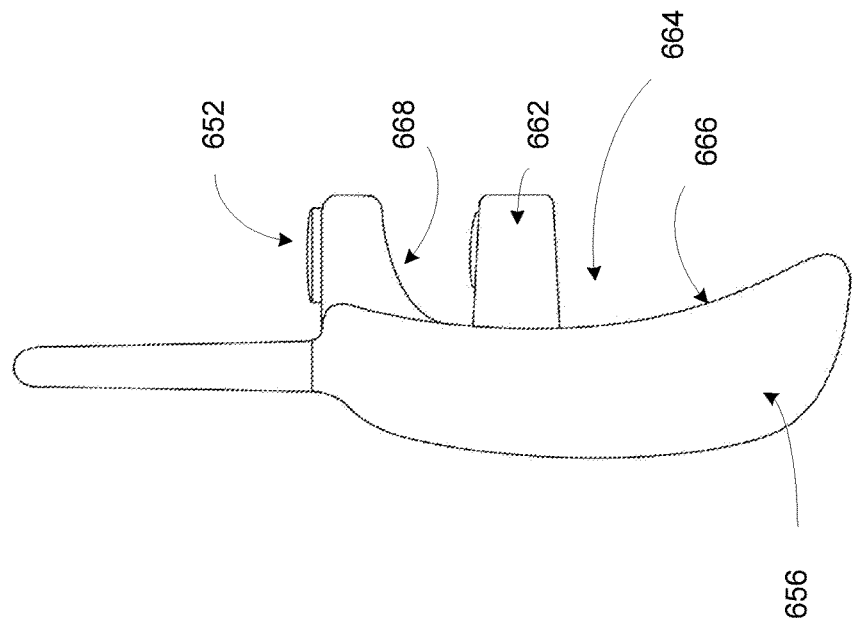
FIGS. 12 and 13 illustrate front and side views of controller according to one embodiment of the invention.
Figure 12:
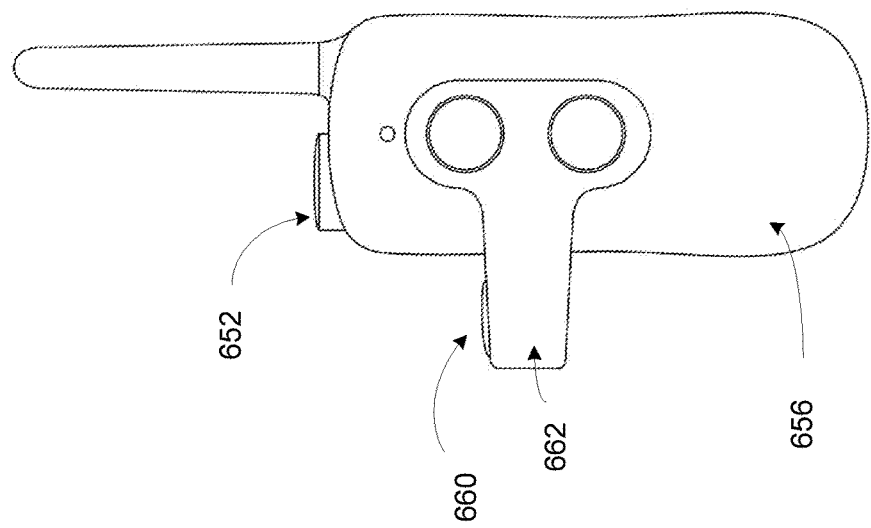

FIGS. 12 and 13 illustrate front and side views of controller 650 according to one embodiment of the invention. Elements described before in relation to FIGS. 10 and 11 won't be described again. Referring to FIG. 13, it may be seen that controller 650 defines an internally curved surface shown generally at 664 to enable the controller to be comfortably worn on a backside of a hand as described in relation to prior embodiments. Internally curved surface 664 includes a first curved portion shown at 666 and a second curved portion shown at 668.

Figure 15:
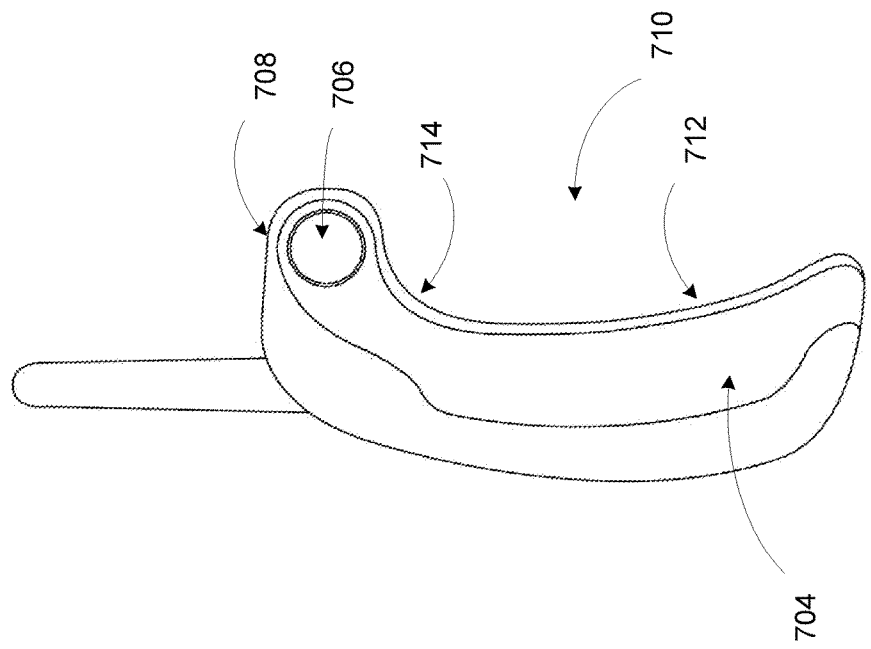
FIGS. 14 and 15 illustrate front and side views of a controller according to an alternative embodiment of the invention.
Figure 14:
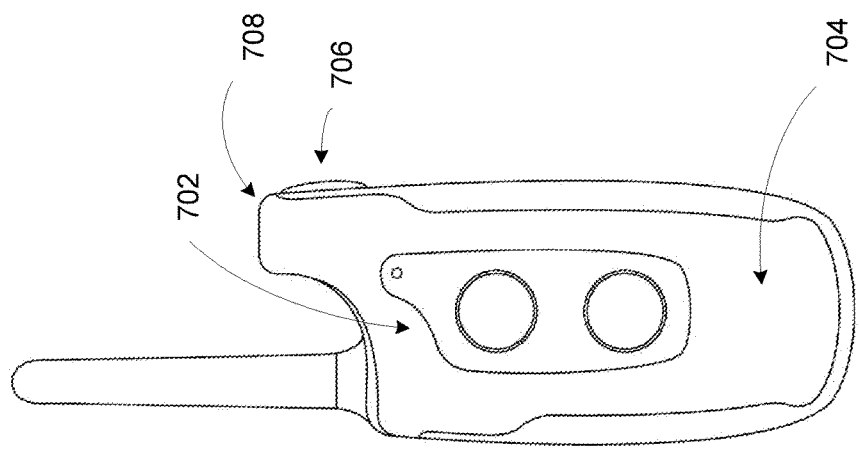

FIGS. 14 and 15 illustrate front and side views of a controller 700 according to an alternative embodiment of the invention. As may be seen in FIG. 14, controller 700 includes at least one control element 702 on an outer surface of a main portion 704 of controller 700. Additionally, controller 700 includes at least one control element 706 on an outwardly extending portion 708 that extends outwardly and substantially orthogonal from main portion 704. In contrast to prior embodiments, however, outwardly extending portion 708 is shaped in a manner that allows at least one control element 706 to be disposed on a side surface of outwardly extending portion 708 in contrast to a top surface of the outwardly extending portion. While not shown here, control elements may also be included on the top surface of outwardly extending portion 708.

Referring to FIG. 15, the at least one control element 706 is shown on a front side of outwardly extending portion 708 when controller 700 is oriented as shown wherein outwardly extending portion 708 extends to the right. In the embodiment of FIGS. 14 and 15, the at least one control element 706 may be disposed on either side of outwardly extending portion 708 according to whether controller 700 is intended to be used on a right hand or a left hand. Alternatively, in an embodiment that includes at least two control elements 706, one control element may be placed on either of two sides of outwardly extending portion 708 of controller 700 or upon a top or bottom surface. For example, a control element 706 may be placed on both a front side and a backside of outwardly extending portion 708. Moreover, in yet another embodiment, a control element 706 may also be placed on a top surface of outwardly extending portion 708.

Controller 700, as in the other embodiments, defines an interior curved surface shown generally at 710 that further defines a first curved portion 712 and a second curved portion 714. These first and second curved portions 712 and 714 support the controller being worn on a backside of a hand or on the fingers or even an arm, wrist or leg in addition to being worn on a palm. Moreover, though now shown here, it should be understood that controller 700 (as do all the controllers) includes a strap such as strap 602 of FIGS. 6 and 7 or a clip (not shown) to secure the controller to the user or a strap such as strap 752 of controller 750 of FIG. 16 described below.

FIG. 16 is an exemplary figure that illustrates a controller being worn in an orientation that is substantially parallel to a direction of a hand to which the controller is attached according to one embodiment of the invention. Specifically, controller 750 is shown in which a strap 752 is attached to attachment points disposed on the sides of controller 750. With this configuration for the strap 752, the controller 750 may be worn as shown in relation to the hand (axially parallel to the hand).

Figure 17:
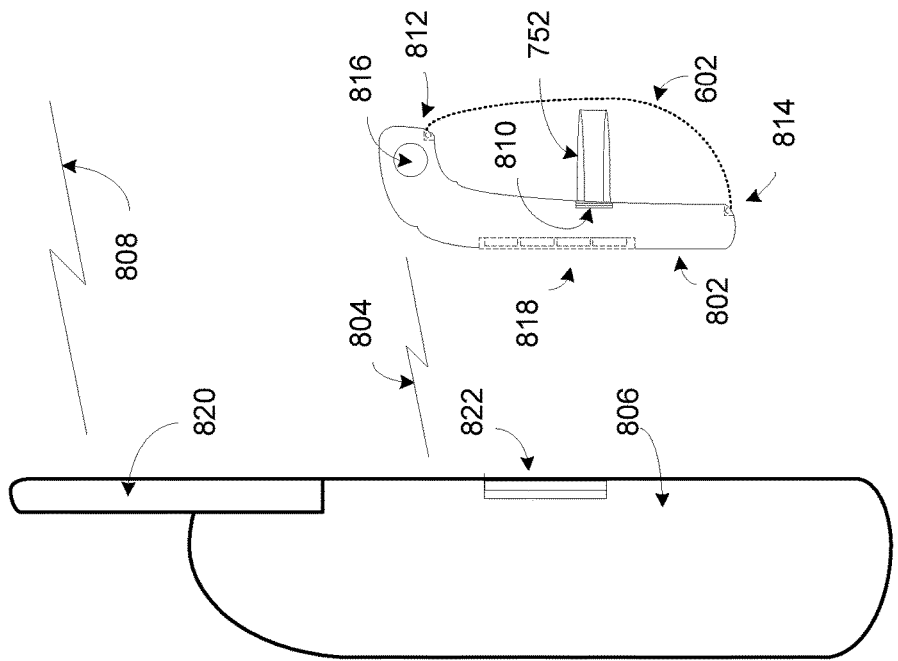
FIG. 17 is a system diagram that illustrates an alternative embodiment of the invention that includes a control unit and a transmitter unit.

FIG. 17 is a system diagram that illustrates an alternative embodiment of the invention that includes a control unit and a transmitter unit. A controller system 800 includes a control unit 802 that communicates over a short distance communication link 804 with a transmitter unit 806. Transmitter unit 806 then communicates with a remote receiver unit being worn by an animal being trained over communication channel 808. In the described embodiment, communication link 804 comprises a personal area network protocol communication link such as Bluetooth. Alternatively, communication link 804 may operate according to a WLAN communication protocol such as IEEE 802.11 or according to another communication protocol. Transmitter 806 further communicates with a receiver unit over communication channel 808 using a communication channel for training devices that comprise a transmitter unit and a receiver unit as described above. Typically such a communication channel is characterized by a lower frequency communication channel that has a longer range.

One noteworthy aspect of the embodiment of FIG. 17 is that the control unit 802 may be made to be much smaller and lighter than a traditional transmitter/control unit because the transmission power requirements are much lower because the communication link is a short distance communication link between the control unit and the transmitter unit. Because the transmission power level is lower, the unit comprises a smaller and lighter battery to support the wireless communications with transmitter 806. Additionally, lower power and smaller components may be used within the transceiver circuitry of controller 802 in relation to transmitter unit 806 and all in one units.

Control unit 802 shows a strap 752 (from FIG. 16) that is connected to an attachment point 810 that is disposed on a side of controller 802. Alternatively, a strap 602 as shown in FIGS. 6 and 7 may be connected to attachment points 812 and 814. As may also be seen, control unit 802 includes a control element 812 and control elements 818. These control elements can comprise any one or more of the control elements described above in relation to the various embodiments of the invention. Finally, transmitter 806 includes an antenna 820 that supports the communication channel with the receiver as described above. Transmitter 806 further includes at least one attachment point 822 for attaching a strap or belt to secure the transmitter unit to the user or a structure or device.

In the embodiment of controller system 800, control elements may be disposed on either one or both of controller 802 and transmitter 806 according to design requirements. Not all control elements are required to be located on control unit 802.

The control elements in the various embodiments of the invention may readily be in any one of a plurality of known types of buttons, switches or dials. For example, in one embodiment of controller 700, 750 or 802, one control element comprises a dial. Such a dial, for example, may be used to select an intensity level of an associated stimulation. While not shown explicitly in FIGS. 17 and 18, a controller may have a pair of outwardly extending portions 708 wherein, when the controller is worn substantially parallel to the direction of the hand, a first outwardly extending portion 708 extends between the thumb and index finger while a second outwardly extending portion 708 extends between the index finger and the middle finger. In such an embodiment, control elements 706 may be similar or of different types. For example, one might be a push button to activate a stimulation while the other comprises a dial for selecting an intensity level.

One additional aspect to the described embodiments of FIGS. 1-16 is that the controller, in one embodiment, is operable to communicate directly with a receiver worn by the animal being trained. This embodiment requires transceiver circuitry and battery power sufficient to transmit a sufficiently strong signal. Thus, for example, the embodiment may require a larger and heavier battery. Alternatively, a controller according to the various embodiments of the invention, may include low power communication circuitry for communicating with a transmitter unit that communicates with the receiver worn by the animal. This embodiment is illustrated in FIG. 17. Such communications may be via a tether or a short distance wireless communication channel such as Bluetooth. In yet another embodiment, the control elements include circuitry that allows them to communicate with circuitry within the controller via a wireless communication links such as Bluetooth. In this embodiment, the control elements may readily be replaced with control elements of a different type to vary the functionality of the controller and the associated control commands that are ultimately transmitted to the receiver.

In one embodiment, one of the control elements is configured to support a "settings lock" mode which prevents operational settings to be changed while the lock mode is supported. In one particular embodiment, one of the control elements and associated hardware within the controller is configured to allow a user to select between one of a plurality of receivers (i.e., dog being trained) and a lock mode. In this particular embodiment, program settings may be modified in the settings lock mode even though current user settings cannot be modified.

In yet another alternative embodiment, the control elements are formed to allow removal and replacement. Each control element includes transceiver circuitry to support wireless communications between the control element and the controller/transmitter.

FIG. 18 is a diagram that illustrates one embodiment of a training system. A training system 850 includes a transmitter or controller 854. Controller 854 may have, but is not required for this embodiment, a curved interior surface as shown generally at 858. Controller 854 generates control commands that are transmitted to receiver 862 via a first communication link 866. More specifically, receiver 862 is coupled to communicate via antenna 870. Antenna 870 and receiver 862 are structurally attached to a collar 874.

One aspect of the embodiment of training system 850 is that at least one control element such as control element 878 is detachable from controller 854. Control element 878 includes a plurality of contact points 882 that allow control element to establish electrical contact with controller 854 when control element 878 is attached to controller 854. In one embodiment, at least 4 contact points 882 are disposed on control element 878 to support charging and powering the control element as well as to support communications between the control element 878 and the controller 854. Additionally, control element 878 is configured to communicate via a wireless communication link 886 with controller 854.

FIG. 19 is a functional diagram that illustrates one embodiment of a removable control element. Control element 878 of FIG. 19 includes a plurality (here, four) contact points 882. Additionally, as shown, control element 878 includes transceiver circuitry 890 that transmits and receives communication signals via antenna 894 in its communications with controller 854. It should be understood that antenna 894 may readily be configured to be a part of the casing of control element 878 and need not be visible as demonstrated in FIG. 19. One advantage of having a detachable control element that is configured to support wireless communications is that the control element may be attached to a matching wristband or ring such that the operator is able to fully use both hands while having at least one control element in a location where it can readily be accessed.

Figure 21:
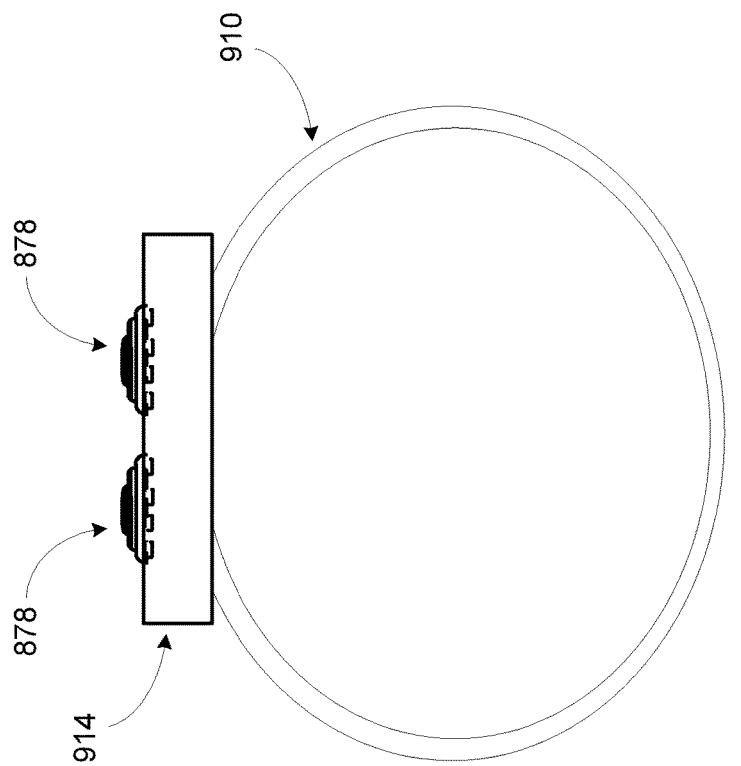
FIG. 21 illustrates a plurality of control elements attached to a wrist band.
Figure 20:
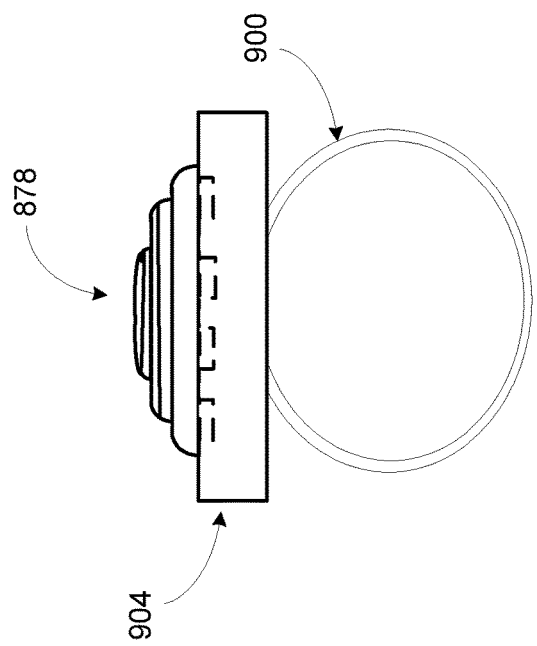
FIG. 20 illustrates a control element attached to a ring according to one embodiment of the invention.

FIG. 20 illustrates a control element attached to a ring. More specifically, a ring 900 includes a base 904 that is configured to receive and securely hold control element 878. FIG. 21 illustrates a plurality of control elements attached to a wrist band. More specifically, a wrist band 910 includes a base 914 that is configured to receive and securely hold at least one control element 878 though a plurality of control elements 878 are shown in FIG. 21.

Figure 22:
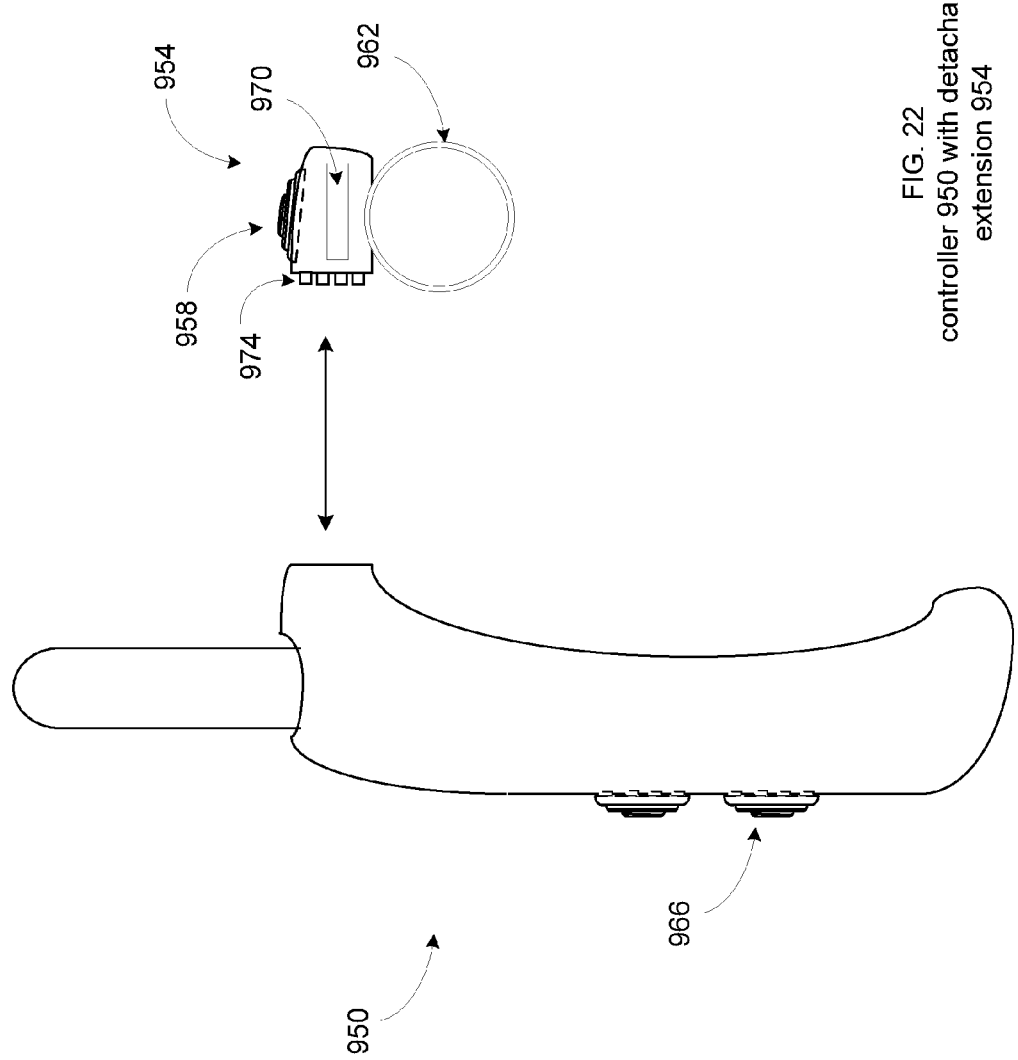
FIG. 22 illustrates an alternative embodiment in which a extension having a control element is removable.

FIG. 22 illustrates an alternative embodiment in which a extension having a control element is removable. Referring to FIG. 22, a controller 950 includes a removable extension 954 that further includes a control element 958. Extension 954 is configured to be attached to a ring 962 (or alternatively a bracelet or other device). As may be seen, controller 950 also includes control elements 966. In the described embodiment, control elements 966 are removable. Alternatively, one or more of control elements 966 are not removable. Finally, removable extension 954 includes circuitry 970 for communicating wirelessly, through the contact points shown generally at 974 and for receiving and storing electrical power through contact points 974. Circuitry 970 includes a battery in one embodiment for storing the received power.

FIG. 23 is a functional block diagram of a controller according to one embodiment of the invention. Controller 600, as previously described, includes a processor or processing logic, operational logic and memory, and communication circuitry to support operations as described throughout this document. One aspect illustrated here in FIG. 23 is that controller 600 may be configured to operate as a trainer or as a remote for a dummy launcher. The mode in which trainer 600 operates maybe selected either by selection or depression of a specified switch or switch position or by activation of a specified combination of switches. Referring back to FIG. 8, for example, a specified switch position of control element 636 may be used to select the dummy launcher mode of operation in which controller 600 operates as a remote for at least one dummy launcher. Alternatively, the simultaneous depression of a plurality of control elements such as control elements 642 and 644 in one embodiment may be used to select the dummy launcher or training modes of operation.

Continuing to refer to FIG. 23, it may be seen that controller 600 may be configured to operate in a training mode or a dummy launch mode. In the training mode, exemplary control element function assignments are shown. In the illustrated configuration, a Nick function is assigned to control element 608. Thus, upon depression of control element 608, either temporary or prolonged, a Nick control command is transmitted to a selected trainer or receiver as selected by control element 636. The intensity of the Nick stimulation may be predefined or it may be as specified by control element 638. Depression of control element 640 activates the Jump mode as described elsewhere herein this document. Depression of control element 642 activates a Vibrate mode. Depression of control element 644 activates the Rise mode as described elsewhere herein this document. Depression of any of these or another control element may also be used to activate an audible tone depending upon configuration of controller 600. It should be understood that the term "activate" means that an associated control command is generated to prompt the receiver (trainer) to activate the associated functionality (Nick mode stimulation, Jump mode stimulation, Rise mode stimulation, Vibrate mode stimulation, or Audible mode stimulation.

As may further be seen, when in a Dummy Launch Mode of Operation, control element 636 may be used to select an associated launcher. Thereafter, based upon configuration, another control element (e.g., control element 608 or control element 644) may be used to prompt controller 600 to transmit a launch command for the selected launcher.

As may further be seen, when in a Dummy Launch Mode of Operation, control element 636 may be used to select an associated launcher. Thereafter, based upon configuration, another control element (e.g., control element 608 or control element 644) may be used to prompt controller 600 to transmit a launch command for the selected launcher.

FIG. 24 is a functional block diagram of a controller according to an alternative embodiment of the invention. Controller 600, as previously described, includes a processor or processing logic, operational logic and memory, and communication circuitry to support operations as described through out this document. One aspect illustrated here in FIG. 24 is that controller 600 may be configured to operate as a trainer and as a remote for a dummy launcher. Referring back to FIG. 8, for example, a specified switch position of control element 636 may be used to select a dual mode of operation in which controller 600 operates as a remote for at least one dummy launcher and as a controller. The simultaneous depression of a plurality of control elements such as control elements 642 and 644 in one embodiment may be used to select the dual mode of operation.

Continuing to refer to FIG. 24, it may be seen that controller 600 may be configured to operate in a training mode and as a remote for a dummy launcher. In the illustrated configuration, the launch function (to operate as a remote for a launcher) is assigned to control element 608. Thus, upon depression of control element 608, a launch control command is transmitted to a launcher. In one embodiment, the launcher is selected or specified by control element 636. If a receiver is selected by control element 636, then depression of control element 640 activates the Jump mode as described elsewhere herein this document. Depression of control element 642 activates a Vibrate mode. Depression of control element 644 activates the Rise mode as described elsewhere herein this document. Depression of any of these or another control element may also be used to activate an audible tone depending upon configuration of controller 600. It should be understood that the term "activate" means that an associated control command is generated to prompt the receiver (trainer) to activate the associated functionality (Nick mode stimulation, Jump mode stimulation, Rise mode stimulation, Vibrate mode stimulation, or Audible mode stimulation.

FIG. 25 is a flow chart that illustrates a method to program a controller without an external computing device according to one embodiment of the invention. The first step of the method is to detect simultaneous depression of at least two control elements (1000). To activate a programming mode, the at least two control elements must be depressed for a specified duration. Accordingly, the next step is to monitor a duration of simultaneous depression of the at least two control elements (1004) and, upon determining that the duration has exceed a specified amount, to enter into a programming mode (1008). Once in a programming mode, the method includes monitoring switch actions to determine desired programming. Thus, the controller is configured to and operates to detect entry of specified switch actions and compare to list of specified switch actions (1012). Finally, the controller is operable to assign functions to control elements based on the specified switch actions (1016).

FIG. 26 is a flow chart that illustrates a method to program a controller via an external computing device according to one embodiment of the invention. The first step of the method is to generate a display on a screen of the computing device or unit of a controller image and its programmable control elements (1020). The second step is to generate a list of programmable functions (1024). In one embodiment, non-programmable functions (if any) are also shown for clarity. Thereafter, the computing device is configured to generate a prompt for the user to select a function and an associated control element until either all programmable functions or all programmable control elements have been programmed (1028). Thereafter, the computing device is configured to establish a communication link with the controller by way of wired or wireless media (1032) and to transmit a list of assigned functions to the controller to enable controller to assign functions to associated control elements as selected by user (1036).

Figure 27:
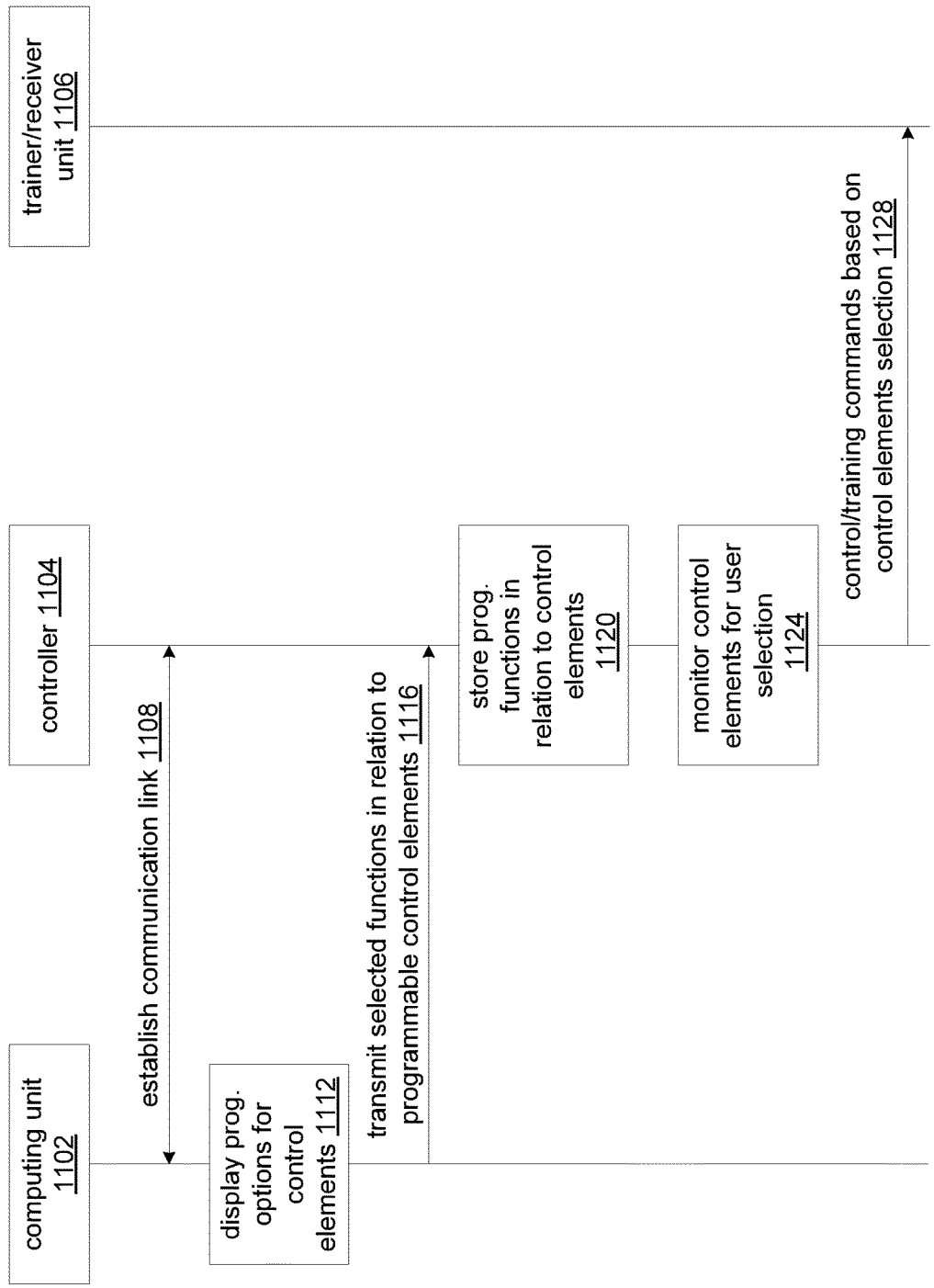
FIG. 27 is a diagram illustrating a training system and operation of the training system according to one embodiment of the invention.

FIG. 27 is a diagram illustrating a training system and operation of the training system according to one embodiment of the invention. As may be seen, a computing unit 1102 is operable to communicate with a controller 1104 that, in turn, is operable to communicate with a trainer/receiver unit 1106 that is worn by the animal under training Computing unit 1102 may be any one of a desktop computer, a laptop computer, a computer tablet, a smart-phone or other cellular device, or another other computing unit with a display that can support generating a display of programming options for a user to assign to various control elements of controller 1104.

Accordingly, computing unit 1102 is operable to establish a communication link with controller 1104 (1108). Additionally, computing unit 1102 is configured to display programming options for the various control elements of controller 1104 (1112). In one embodiment, computing unit 1102 generates an image of controller 1104 with numbers or letters used to identify which control elements of control element 1104 may be programmed. Additionally, computing unit 1102 generates a list of selectable functions in a manner that allows the user to associate desired functions to selected control elements. Some of the selectable functions may, in turn, have selectable options. For example, for Jump Mode of operation, the user needs to select a Jump Mode stimulation level. Thus, as a part of displaying programming options, computing unit 1102 displays options that correspond to the selectable functions (such as the stimulation level for the Jump Mode operations). Once the user is finished selecting functions and associated control elements, computing unit 1102 transmits selected functions in relation to the control elements to controller 1104 over the established communication link (1116). It should be understood that the step of establishing a communication link between computing unit 1102 and controller 1104 may be performed either before or after, the user makes programming selections for the control elements of controller 1104.

Once controller 1104 receives the programming selections in step 1116, controller 1104 stores the programming functions in relation to the control elements (1120). Thereafter, controller 1104 monitors the control elements for user selection (1124). Once a user selection of a control element is determined to have occurred by controller 1104, controller 1104 determines what function is being activated or selected by the user. Thereafter, controller 1104 transmits control/training commands based on the selected control element (1128) to prompt the trainer/receiver unit 1106 to perform the associated function.

Figure 28:
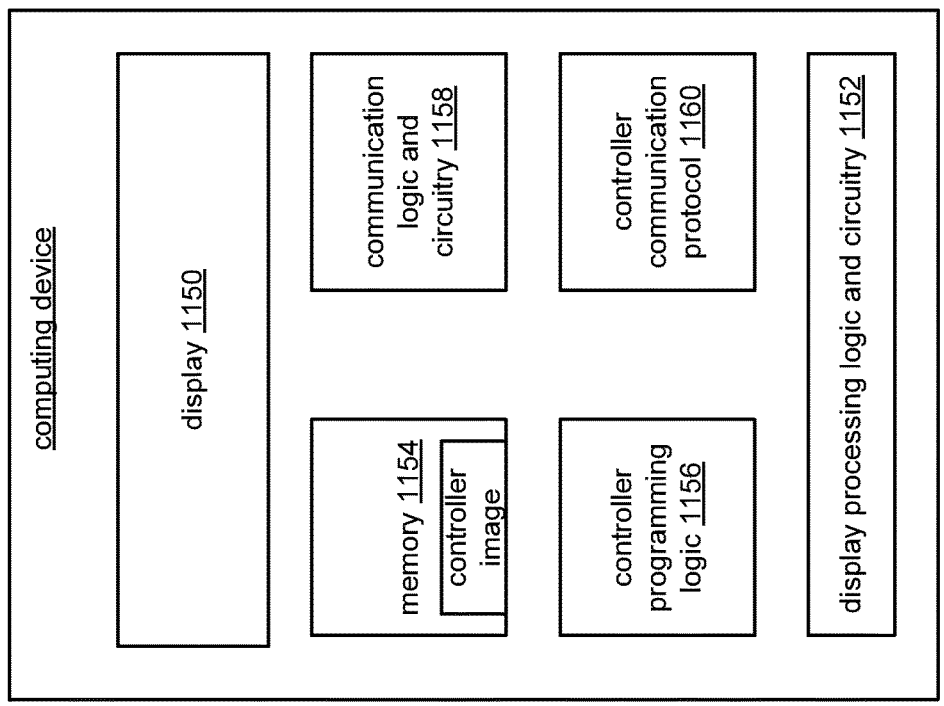
FIG. 28 is a functional block diagram of a computing unit according to one embodiment of the invention that is configured to program control elements of a controller.

FIG. 28 is a functional block diagram of a computing unit according to one embodiment of the invention that is configured to program control elements of a controller. Referring to FIG. 28, a computing device, which may be any of a desktop computer, a laptop computer, a computer tablet, or a smart phone (or other similar device) is shown. Computing unit 1102 includes a display 1150 that displays images for a user to view as specified by control signals transmitted by display processing logic and circuitry 1152. In the described embodiment, circuitry 1152 is configured to generate control commands to generate a display of a controller whose image is stored in digital form within memory 1154. Controller programming logic 1156 is operable to generate options for user selection that are displayed on display 1150 as specified by display processing logic and circuitry 1152. Generally, programming logic 1156 communicates with circuitry 1152 to generate user selectable options for programming a controller in a manner desired by a user. More specifically, options are generated to allow the user to select from a list of selectable functions and to assign the selected functions to any one of a number of control elements that are shown on an image shown on display 1150. Additionally, where applicable, programming logic 1156 also causes selectable options that correspond to the selectable functions (and even non-selectable functions) to be displayed to prompt the user for an associated selection or entry. One example discussed in relation to FIG. 27 is the specification of a Jump Mode stimulation level if the Jump Mode options is selected. In one embodiment, display 1150 comprises a touch screen to receive user input. In another embodiment, keystrokes are monitored to determine user selection. Specific instructions are generated for the user to enter a selection in a specified manner.

Computing unit 1102 further includes communication logic and circuitry 1158 that communicates with controller for training animals according to any one of a plurality of known communication protocols. Additionally, in one embodiment, computing unit 1102 further includes a controller communication protocol logic block 1160 that includes communication protocol that is for communicating with the remote controller. Thus, computing unit 1102 transmits selected functions and associated control elements assignments to the controller. Further, when appropriate, computing unit 1102 also transmits associated functional parameters such as, for the Jump Mode, an associated stimulation level for when the Jump Mode is activated.

The invention disclosed herein is susceptible to various modifications and alternative forms. Specific embodiments therefore have been shown by way of example in the drawings and detailed description. For example, anyone of the embodiments for control elements and their disposition or placement on a transmitter or control unit may be used for anyone of the plurality of controller/transmitter configurations. It should be understood, however, that the drawings and detailed description thereto are not intended to limit the invention to the particular form disclosed, but on the contrary, the invention is to cover all modifications, equivalents, and alternatives falling within the spirit and scope of the present invention as defined by the claims.

What is claimed is:

1. A training system, comprising:
    a stimulation unit configured to be worn by an animal;
    a controller communicatively coupled to the stimulation unit; and
    wherein the controller further includes:
        a casing that includes a plurality of control elements for selecting control commands that are to be transmitted to a trainer wherein the control elements comprise any one of buttons, dials and knobs;
        an antenna for communicating with the trainer;
        control circuitry for generating control commands based upon the selected control commands;
        a strap coupled to the casing for securing the controller to a user's hand, the strap attaching to the casing at a pair of attachment points wherein the controller is configured to be worn comfortably across a back side of a user's hand and is further configured to allow the user to access at least one control element by the same user's hand; and
        at least one control element disposed on an outwardly extending arm that extends outwardly from a main body of the casing, wherein the at least one control element may readily be accessed by a finger or thumb of the user's hand to which the controller is securely attached and wherein the at least one control element is configured to be physically detached and that is further configured to communicate with a remaining portion of the controller wirelessly to convey an indication that the control element has been depressed.

2. The training system of claim 1 wherein the controller further includes a microphone and audio processing circuitry for receiving and interpreting at least one voice command.

3. The training system of claim 1 wherein at least one control element is programmable by a user.

4. The training system of claim 1 wherein the controller further includes GPS circuitry for supporting location based training system modes of operation.

5. The training system of claim 1 wherein the controller further includes logic to support electronic fence modes of operation.

6. The training system of claim 1 wherein the controller wherein the casing defines a concave interior shape to fit around a top outer surface of a back side of a hand.

7. The training system of claim 1 wherein the controller further includes:
    circuitry for communicating with a smart phone; and
    logic for establishing operational parameters based at least in part upon communications with the smart phone.

8. The training system of claim 1 wherein the controller further includes a strap that can be attached to the casing in a plurality of different manners to allow the casing to be oriented relative to the user's hand in a plurality of different ways.

9. The training system of claim 1 wherein the controller further includes a plurality of control elements on an outer surface of the controller.

10. The training system of claim 1 wherein the controller further includes circuitry for communicating with a computer.

11. The training system of claim 1 wherein the controller further includes logic for receiving and processing configuration commands from the computer.

12. A training system for training animals, comprising:
    a transmitter unit for generating radio frequency (RF) signals wherein the transmitter unit is operable to select between a plurality of functions and to generate a control command specifying at least one of vibration, high-frequency beep, vibration with high frequency beep, shock and shock intensity; and
    a receiver unit for receiving the transmitted RF signals and the control command wherein the received initiates a stimulation based upon the control command, the receiver unit further including at least one antenna structurally arranged in relation to a collar worn by an animal; and
    wherein the transmitter unit defines a concave shape to support comfortably wearing the transmitter unit on a back side of a hand, and further wherein the transmitter unit includes at least one control element disposed on an outwardly extending arm that extends outwardly from a main body of the transmitter unit, wherein the at least one control element may readily be accessed by a finger or thumb of the user's hand to which the controller is securely attached; and wherein the transmitter unit includes at least one control element that is configured to be physically detached and that is further configured to communicate with a remaining portion of the controller wirelessly to convey an indication that the control element has been depressed.

13. The controller of claim 12 wherein the receiver unit includes a transmitter module for generating communication signals to the transmitter unit.

14. The controller of claim 12 wherein the transmitter module generates communication signals according to a cellular communication protocol.

15. The controller of claim 12 wherein the transmitter module generates short message service messages for delivery to the receiver unit.

16. The controller of claim 15 wherein the short message service messages include a receiver ID and a GPS location.

17. The controller of claim 15 wherein the transmitter module generates communication signals according to a cellular protocol or short message service messages to the receiver unit only when the receiver unit is more than a specified distance from a last known location of the transmitter unit.

18. A controller of a training system, comprising:
    transmitter circuitry disposed within a casing, the transmitter circuitry for communicating with a receiver to be worn by an animal;
    a strap for attaching the controller to a back side of a user's hand;
    at least one control element disposed on an outwardly extending arm that extends outwardly from a main body of the casing, wherein the at least one control element may readily be accessed by a finger or thumb of the user's hand to which the controller is securely attached;
    wherein the transmitter circuitry includes at least one control element that is configured to be physically detached and that is further configured to communicate with a remaining portion of the controller wirelessly to convey an indication that the control element has been depressed; and
    the casing defining an interior concave shape to support wearing the transmitter unit comfortably on a back side of a hand, a plurality of fingers, an arm, a leg or a wrist and is further configured to allow the user to access at least one control element by the same user's hand to which the controller is attached.

19. The controller of claim 18 wherein the concave shape of the inside surface of the controller defines a curved shape that curves along a length of the controller.

20. The controller of claim 19 further including at least one outwardly extending portion that is configured to include at least one control element.

* * * * *